(12) United States Patent  
Young et al.

(10) Patent No.: US 11,176,361 B2  
(45) Date of Patent: Nov. 16, 2021

(54) HANDWRITING DETECTOR, EXTRACTOR, AND LANGUAGE CLASSIFIER

(71) Applicant: Raytheon Company, Waltham, MA (US)

(72) Inventors: Darrell L. Young, Falls Church, VA (US); Kevin C. Holley, Reston, VA (US)

(73) Assignee: Raytheon Company, Waltham, MA (US)

( * ) Notice: Subject to any disclaimer, the term of this patent is extended or adjusted under 35 U.S.C. 154(b) by 135 days.

(21) Appl. No.: 16/448,883

(22) Filed: Jun. 21, 2019

(65) Prior Publication Data

US 2019/0392207 A1    Dec. 26, 2019

Related U.S. Application Data

(60) Provisional application No. 62/687,962, filed on Jun. 21, 2018.

(51) Int. Cl.

| | | |
|---|---|---|
| *G06F 40/171* | (2020.01) | |
| *G06F 40/263* | (2020.01) | |
| *G06K 9/00* | (2006.01) | |
| *G06K 9/34* | (2006.01) | |
| *G06K 9/38* | (2006.01) | |
| *G06K 9/62* | (2006.01) | |
| *G06K 9/68* | (2006.01) | |
| *G06K 9/72* | (2006.01) | |

(52) U.S. Cl.  
CPC ....... *G06K 9/00409* (2013.01); *G06F 40/263* (2020.01); *G06K 9/00416* (2013.01); *G06K 9/6256* (2013.01)

(58) Field of Classification Search  
None  
See application file for complete search history.

(56) References Cited

U.S. PATENT DOCUMENTS

| | | | | |
|---|---|---|---|---|
| 5,438,630 A | * | 8/1995 | Chen | G06K 9/00463 382/159 |
| 6,041,141 A | * | 3/2000 | Yamamoto | G06K 9/726 382/229 |

(Continued)

OTHER PUBLICATIONS

Zhu et al., "Signature Detection and Matching for Document Image Retrieval," IEEE Transactions on Pattern Analysis and Machine Intelligence, vol. 31, No. 11, Nov. 2009 (Year: 2009).*

(Continued)

*Primary Examiner* — Soo Shin  
(74) *Attorney, Agent, or Firm* — Schwegman Lundberg & Woessner, P.A.

(57) ABSTRACT

Disclosed are methods for handwriting recognition. In some aspects, an image representing a page of a sample document is analyzed to identify a region having indications of handwriting. The region is analyzed to determine frequencies of a plurality of geometric features within the region. The frequencies may be compared to profiles or histograms of known language types, to determine if there are similarities between the frequencies in the sample document relative to those of the known language types. In some aspects, machine learning may be used to characterize the document as a particular language type based on the frequencies of the geometric features.

20 Claims, 20 Drawing Sheets

(56) References Cited

U.S. PATENT DOCUMENTS

| | | | | |
|---|---|---|---|---|
| 8,391,613 B2* | 3/2013 | Zhu | ................... | G06K 9/00422 382/200 |
| 10,904,027 B1* | 1/2021 | Basak | ................. | H04L 12/2816 |
| 2005/0038644 A1* | 2/2005 | Napper | .............. | G06K 9/00852 704/9 |
| 2007/0005537 A1* | 1/2007 | Abdulkader | ......... | G06K 9/6254 706/20 |
| 2009/0285482 A1* | 11/2009 | Epshtein | ............ | G06K 9/00463 382/176 |
| 2010/0080462 A1* | 4/2010 | Miljanic | ............ | G06K 9/00429 382/186 |
| 2011/0249897 A1* | 10/2011 | Chaki | ..................... | G06K 9/34 382/177 |
| 2019/0392207 A1* | 12/2019 | Young | ..................... | G06K 9/38 |

OTHER PUBLICATIONS

Bay, Herbert, et al., "Speeded-Up Robust Features (SURF)", Computer Vision and Image Understanding, 110(3), (2008), 346-359.

Cavnar, William B., et al., "N-Gram-Based Text Categorization", (May 2001), 14 pgs.

Csurka, G., et al., "Visual Categorization with Bags of Keypoints", ECCV Workshop on Statistical Learning in Computer Vision, (2004), 16 pgs.

Otsu, N., "A Threshold Selection Method From Gray-Level Histograms", IEEE Transactions on Systems, Man, and Cybernetics, vol. SMC9, No. 1, (Jan. 1979), 62-66.

Sauvola, J., et al., "Adaptive document image binarization", Pattern Recognition 33, (2000), 225-236.

\* cited by examiner

| BINARIZATION APPROACHES P(1) = 4 | HANDWRITING RECOGNITION APPROACHES P(2) = 2 | LANGUAGE CLASSIFICATION APPROACHES P(3) = 3 |
|---|---|---|
| OTSU'S METHOD | LINE-CUTS | SPED UP ROBUST FEATURES (SURF) WITH SUPPORT VECTOR MACHINE (SVM) CLASSIFIER |
| MODIFIED SAUVOLA' METHOD | DEEP PAGE LAYOUT | N-GRAM FEATURES WITH K-NEAREST NEIGHBOR CLASSIFIER |
| COLOR | | DEEP LEARNING CNN |
| GRAPH BASED | | |

FIG. 1

LINE SHAPES

1 HORIZONTAL LINE
2 VERTICAL LINE
3 LOWER CROSS
4 UPPER CROSS
5 LOWER T
6 UPPER T
7 LOWER L
8 UPPER L
9 LOWER UPSIDE DOWN L
10 UPPER UPSIDE DOWN L
11 F
50 DIAGONAL LINE
51 HORIZONTAL DIAGONAL LINE
52 VERTICAL DIAGONAL LINE

HORSESHOE SHAPES

15 EAST HORSESHOE
16 NORTH HORSESHOE
17 WEST HORSESHOE
18 SOUTH HORSESHOE

ACCENT FEATURES

60 DOT
61 DASH
62 AIGU
63 GRAVE
64 CIRCUMFLEX
65 TILDE
66 CARON
67 BREVE
68 INVERTED BREVE
69 HOI
70 CIRCLE ACCENT

CIRCULAR FEATURES

19 BIG LOWER CIRCLE
20 BIG UPPER CIRCLE
21 SMALL LOWER CIRCLE
22 SMALL UPPER CIRCLE
23 BIG LOWER HORIZONTAL OVAL
24 BIG UPPER HORIZONTAL OVAL
25 SMALL HORIZONTAL LOWER OVAL
26 SMALL HORIZONTAL UPPER OVAL
27 BIG LOWER VERTICAL OVAL
28 BIG UPPER VERTICAL OVAL
29 SMALL VERTICAL LOWER OVAL
30 SMALL VERTICAL UPPER OVAL

*FIG. 9*

HANDWRITING DETECTOR, EXTRACTOR, AND LANGUAGE CLASSIFIER

CROSS REFERENCE TO RELATED APPLICATIONS

This application claims priority to U.S. Provisional Application No. 62/687,962, filed Jun. 21, 2018 and entitled "HANDWRITING DETECTOR, EXTRACTOR AND LANGUAGE CLASSIFIER." The contents of this prior application are considered part of this application, and is hereby incorporated by reference in its entirety.

GOVERNMENT RIGHTS

This invention was made with Government support under government contract IS-FI-4382 awarded by the Combating Terrorism Technical Support Office. The Government has certain rights in this invention.

BACKGROUND

The written record is considered by historians as man's transition from pre-history. More importantly, handwriting (and accounting) enabled the further development of civilization with records such as agricultural yields, livestock, births, and land ownership, which in turn led to centralized management and the rise of cities. Despite the centrality of handwriting, modern information processing methods are challenged to correctly identify handwriting in all its forms. Thus, improved methods of handwriting recognition are desired.

BRIEF DESCRIPTION OF THE DRAWINGS

FIG. 1 lists several techniques for handwriting detection and language determination;

FIG. 9 lists feature tokens detected in handwriting and used to build n-gram feature vector histograms.

DETAILED DESCRIPTION

Figure 2:
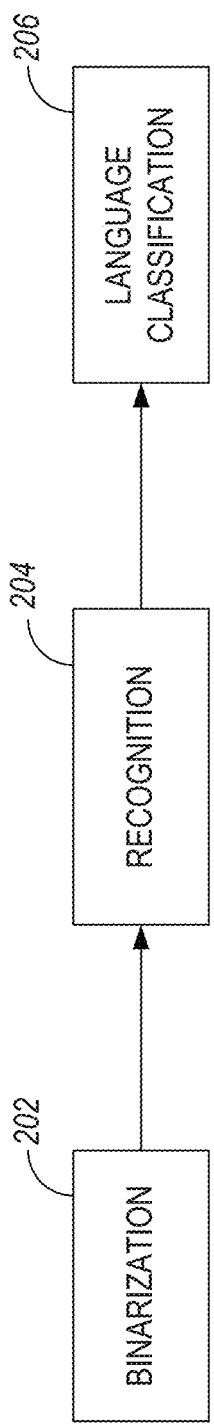
FIG. 2 illustrates a simple process flow for language classification.

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various embodiments described herein address the general, more difficult problem of extracting and classifying handwriting of unknown location, size, color, content, and language, in a document also containing undefined images and undefined printed text.

While handwriting has played a significant role in the development of mankind, it's ironic that modern information processing systems rely on structured text formats to "read" text data. An example of a structured format would include a form, where printed text has spaces or boxes for the reader to fill in by hand comments or other information. The detection of the presence of handwriting in structured data may be machine readable given the limited answers expected. In contrast, unstructured formats include any printed media, such as a letter, report, or magazine page over which handwriting may or may not be present or even expected. If the handwriting is present, it may appear anywhere on the page in any size or orientation, and cannot reliably be "read", particularly when of unknown language or mixed with printed text and images. While Optical Character Recognition (OCR) of printed text has become robust, even routine, Handwriting Character Recognition (HCR) remains stubbornly difficult except for controlled input conditions. The few successful applications, such as postal code address reading, or form scanning, require a defined input format of expected content.

High value documents, such as mission plans, or intelligence reports may be handwritten for cultural reasons or to frustrate electronic methods of surveillance. The age-old method of couriering sealed handwritten documents is impervious to modern threats of hacking and electronic attack. Most of today's handwritten documents do not possess such levels of intrigue, but rather reflect everyday activities such as diaries, calendar notes, letters, to-do lists, and other common artifacts. However, even these seemingly mundane snippets of information can shed light on an intelligence analysis problem if properly indexed and searched. Separating the wheat from the chaff is an overwhelming task given the large volume of documents which contain unstructured handwriting notes, mixed with print and images.

A first step in solving this problem is to discover the handwriting within a document and determine the language so that the HCR algorithm may be properly initialized. This may be a big data problem due to the enormity of document datasets. In addition, discovering handwriting and its language may be a machine learning challenge due to the wide variability between languages, people, sensors, and environmental conditions such as poor or uneven lighting.

FIG. 1 lists several techniques for segmentation, recognition, and language classification of handwriting.

FIG. 2 illustrates an example process flow for language classification. The flow 200 of FIG. 2 includes binarization 202, recognition 204, and language classification 206. The simple process flow shown in FIG. 2 does not reflect the combined algorithmic complexity of integrating and evaluating the various segmentation, recognition, and language classification approaches. For example, considering the techniques listed in FIG. 1, the total number of system configurations is the overall product of all possible combinations of algorithms for each stage. In this case there are four binarization techniques, two recognition techniques and 3 three language classification techniques or 24 total (=4× 2×3) which, when coupled with the all the parameter settings of each individual algorithm, can easily stress the test/ evaluation capacities.

Dividing the processing of a document into three stages helps confine this complexity by allowing algorithms at each stage to be optimized as an independent problem. Complexity is further managed through separation of the document handling and user interfaces from the algorithm development within the evaluation architecture as shown in FIG. 3.

Figure 3:
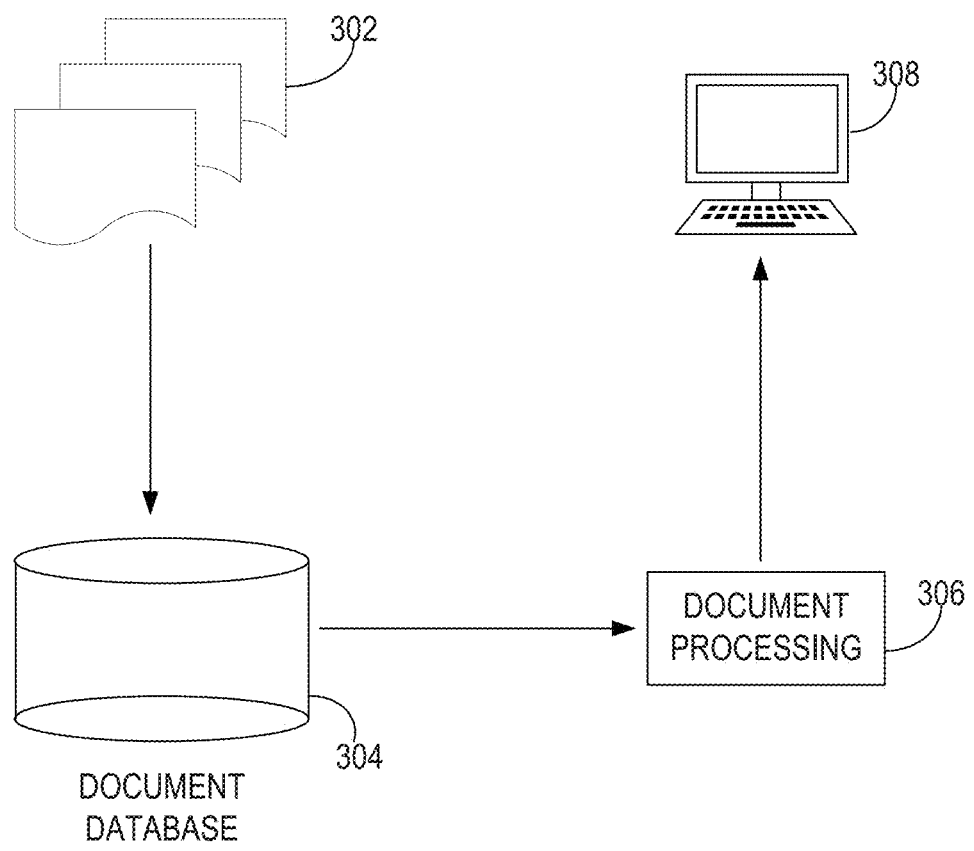
FIG. 3 illustrates the separation of the algorithmic and infrastructure.

FIG. 3 illustrates separation of algorithmic infrastructure from storage infrastructure. FIG. 3 shows that images 302 of documents may be stored in a data store 304. In some aspects, the data store 304 may utilize a "Mongo" database. A document processing component 306 reads the images from the datastore 304 to detect handwriting on the documents 302. The document processing component 306 may utilize a variety of technologies to perform this task. For example, the processing may be implemented in a variety of programming languages, including java, C++, python, Perl, or other languages known in the art. In some aspects, the document processing component 306 may rely on MatLab® functions.

By separating the processing infrastructure from document storage infrastructure as illustrated by FIG. 3, the infrastructure is able to scale to available resources required to handles millions of documents in an automatic workflow. This provides for users to direct and annotate processing results. Users can point the system to collections of scanned images and route the processed result to the appropriate language specialist. Users can annotate the machine learning results as being incorrect or missing. The annotations may be used for further analysis such as algorithm refinement.

One goal of binarization is to convert the input document so that the foreground which includes the handwriting, is logical true. This simple procedure proves to be a difficult task due to variations in illumination, condition of the paper, and other factors such as variations in the ink. The success, however, of the later stages of handwriting recognition and language classification depend on a good binarization.

Otsu's method calculates a global threshold by maximizing the interclass variance between the foreground and the background. This approach may not succeed in particular circumstances. For example, when handwriting in an image is a light gray, such as when using a pencil, while a remaining portion of the image has darker interfering elements such as machine printed text or images, Otsu's method may not properly detect the handwriting.

Niblack first applied an adaptive method to adjust the binarization threshold, similar to the way a Constant False Alarm Rate (CFAR), by making the threshold proportional to the local mean and standard deviation of a sliding window. Sauvola's experiments demonstrated that including a term proportional to the product of the local mean and standard deviation could provide better results. In embodiments, Sauvola's method was modified to first pre-process the input image using a stretch histogram in portions of a document having energy above a threshold value.

Figure 4:
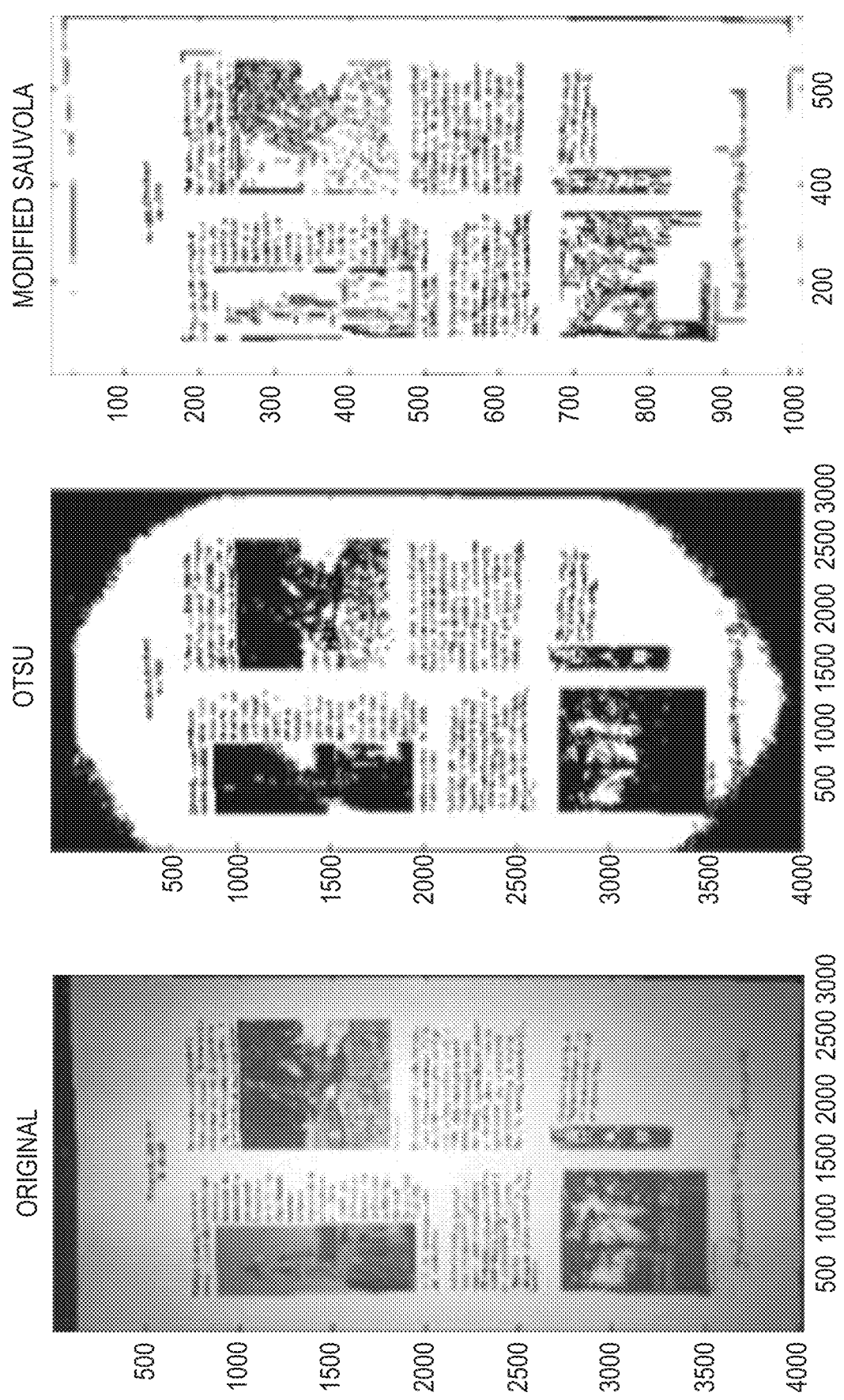
FIG. 4 shows the results of the modified Sauvola method.

FIG. 4 shows the results of the modified Sauvola method.

Figure 5:
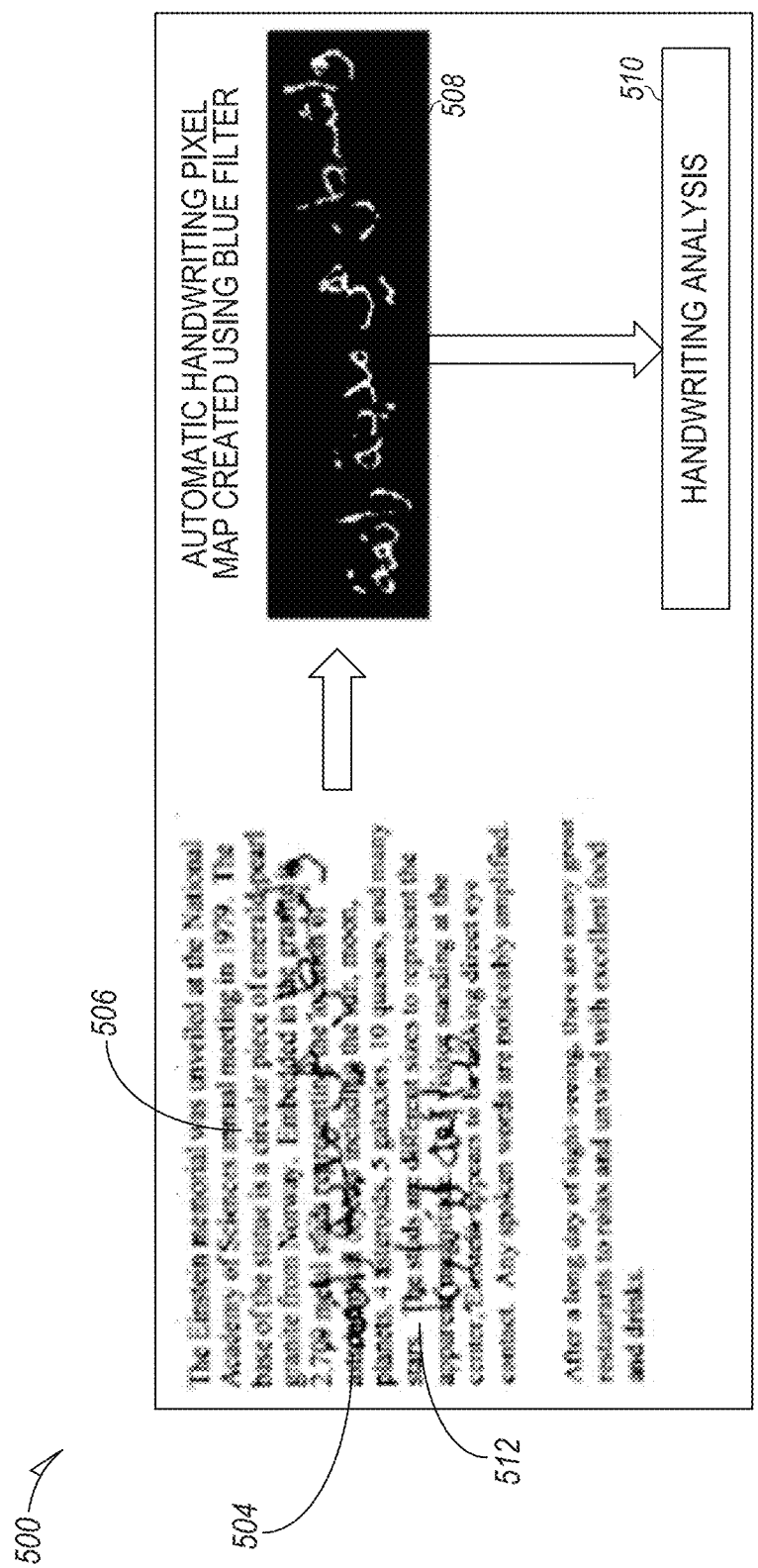
FIG. 5 shows blue Arabic handwriting on top of black text.

FIG. 5 illustrates the use of differences in color to detect handwriting. Handwriting may be done in a particular color of ink. This particular color may be different than a color of machine printed text. In some cases, handwriting in one color may be performed over printed ink of a second color. Separation of handwriting on top of machine printed text is much less difficult if such a color difference can be exploited. Various embodiments include algorithms to extract handwriting over printed text when there is a color difference. FIG. 5 shows a printed sample 500 including blue Arabic handwriting 504 on top of black text 506. A blue filter is configured to extract the blue handwriting 508. In an example, the blue filter functions by filtering out non-blue colors within a threshold. Handwriting analysis and extraction 510 may then be performed on the filtered data. The extracted handwriting is then sent to downstream processing for additional analysis, e.g., language identification. FIG. 5 also shows additional Arabic handwriting 512 written in black ink positioned below the blue. Various embodiments may use a graph-based segmentation algorithm to extract the handwriting 512 when there is no exploitable color difference between the background text 506 and the overwritten text 512.

Some features that distinguish handwriting from printed text may include a lack of alignment among characters within a word, or a lack of alignment between words within a phrase or sentence. Handwriting also generally has greater variation in space distances between handwritten characters than is found in printed text. Another variation may be found in relative character sizes. To identify these properties, an embodiment aligns suspected handwriting and measures a lack of structured printed text uniformity in the suspected handwriting. Conventional methods to distinguish handwriting from machine printed text exploit these variations by taking a horizontal line cut and measuring the variations between characters and words. Vertical line cuts may be used to detect the uniformity of lower and upper case variation in printed text. One disadvantage of the line cut method is it fails to properly process embedded images, such as those found in magazine or news articles. Embedded images may also frequently have unstructured variation which may result in a classification method based on the line cut method to confuse images for handwriting.

Figure 6:
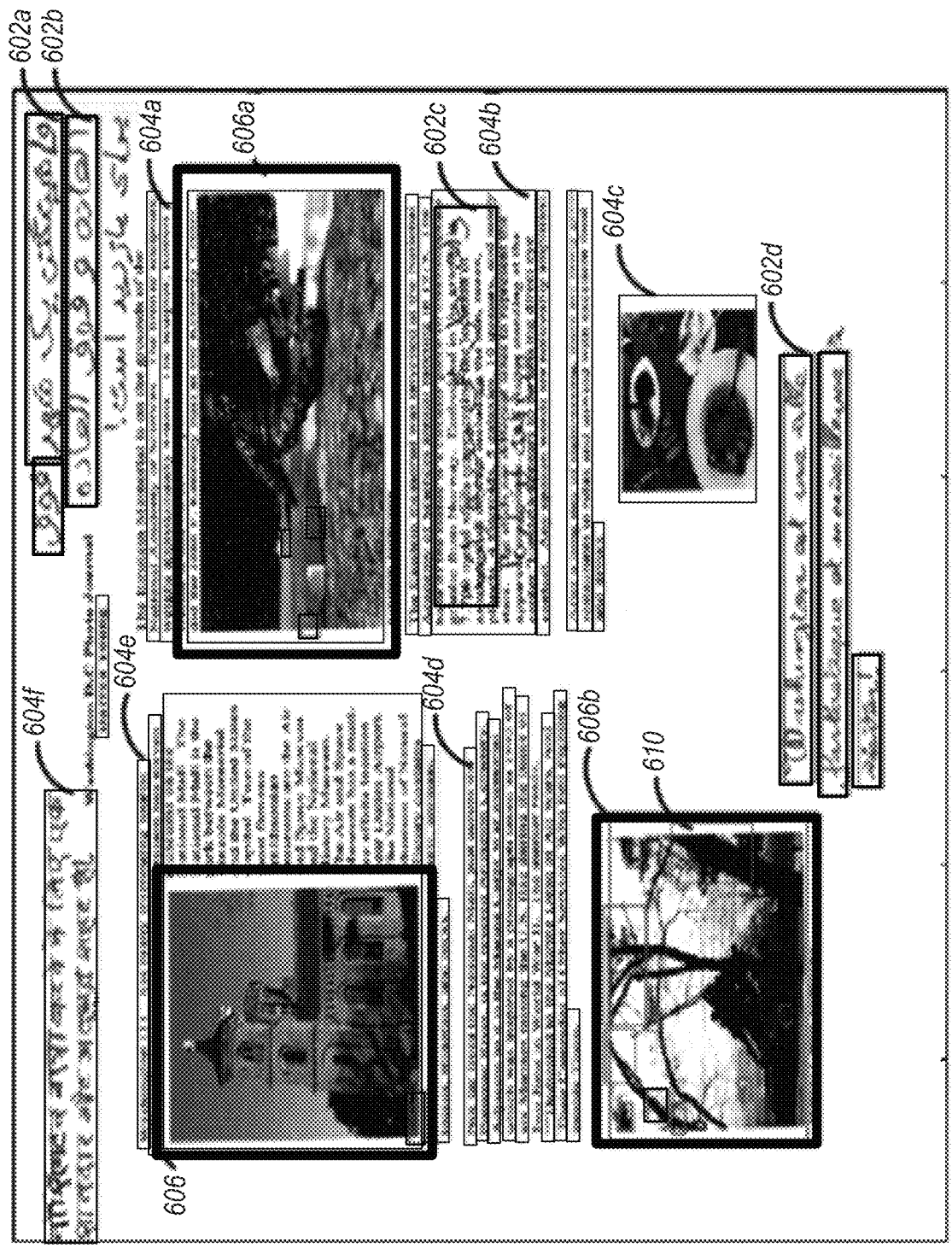
FIG. 6 illustrates detected regions of images and handwriting in a document according to various embodiments.

FIG. 6 illustrates detected regions of images and handwriting in a document 600 according to various embodiments. The document 600 is a page from a travel article about Washington D.C. Various embodiments use a trained deep CNN to recognize handwriting, machine printed text, and images. In an embodiment, the deep CNN is trained using a training set of printed text, handwriting, and images. The boxes 602a-d in the document 600 show handwriting detected by the deep CNN. The boxes 604a-f are detected text. The green boxes 606 are detected images. In an example, the document 600 may be represented as an image. The image may be provided as input to the deep CNN. The deep CNN may then detect images inside the overall document image. Similar to the line cut problem, image 610 may be falsely detected a handwriting. In some embodiments, a configuration option is provided that selects whether to continue to process candidate handwriting on top of detected images. For example, via the configuration option, an embodiment may be configured to ignore or alternatively to process handwriting within an image.

Figure 7:
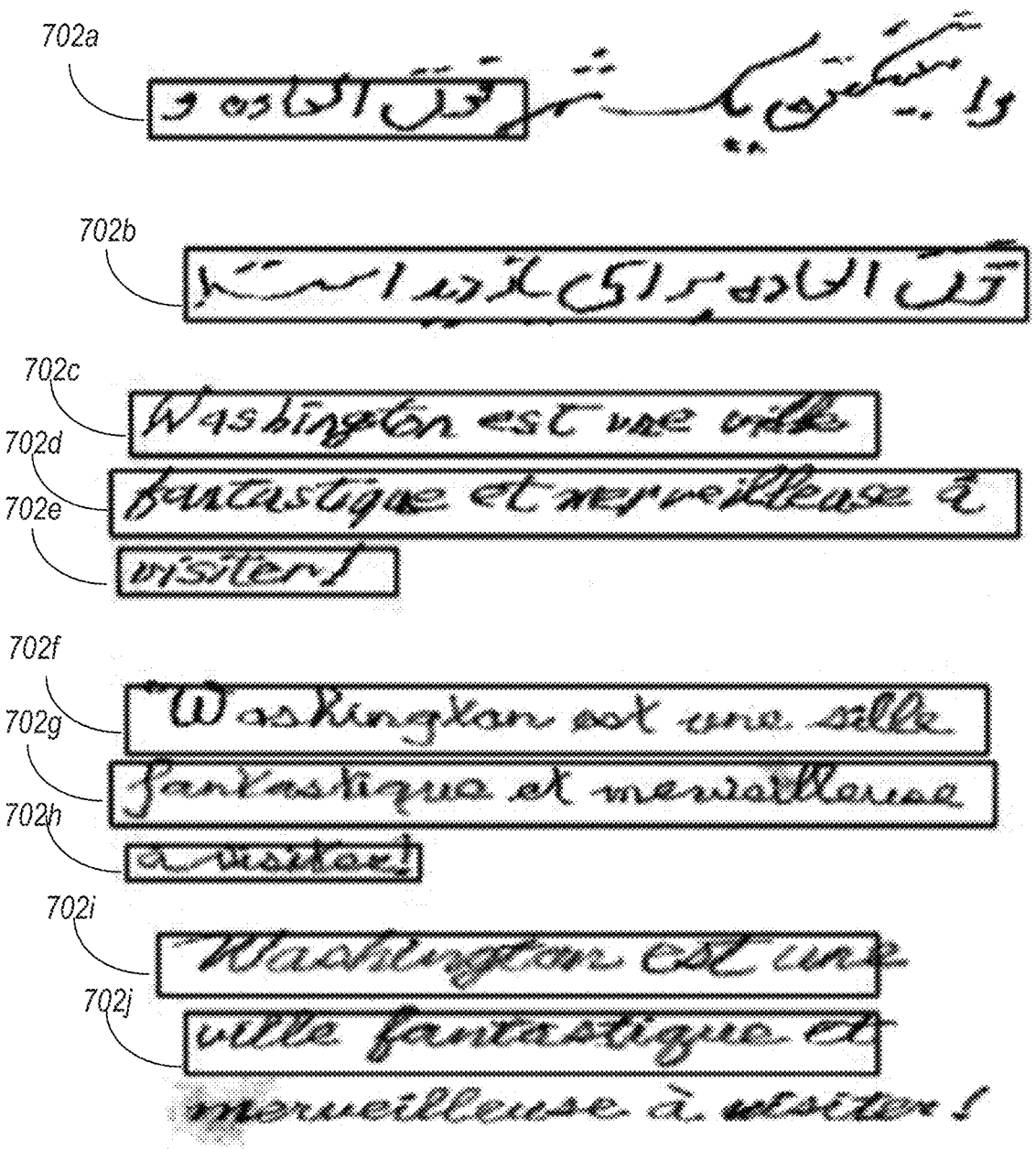
FIG. 7 is an example of detected words and phrases used to build the training set.

One challenge associated with machine learning is training set preparation. With the present embodiments, available handwriting data included a collection of handwritten documents in various languages. In preparation for training, each document was segmented into a collection of small, binarized images. FIG. 7 shows example detected words and phrases outlined in boxes 702a-j used to build the training set.

Once the handwriting had been extracted, various versions were created using image warping routines to slant the image to the left and to the right.

Figure 8:
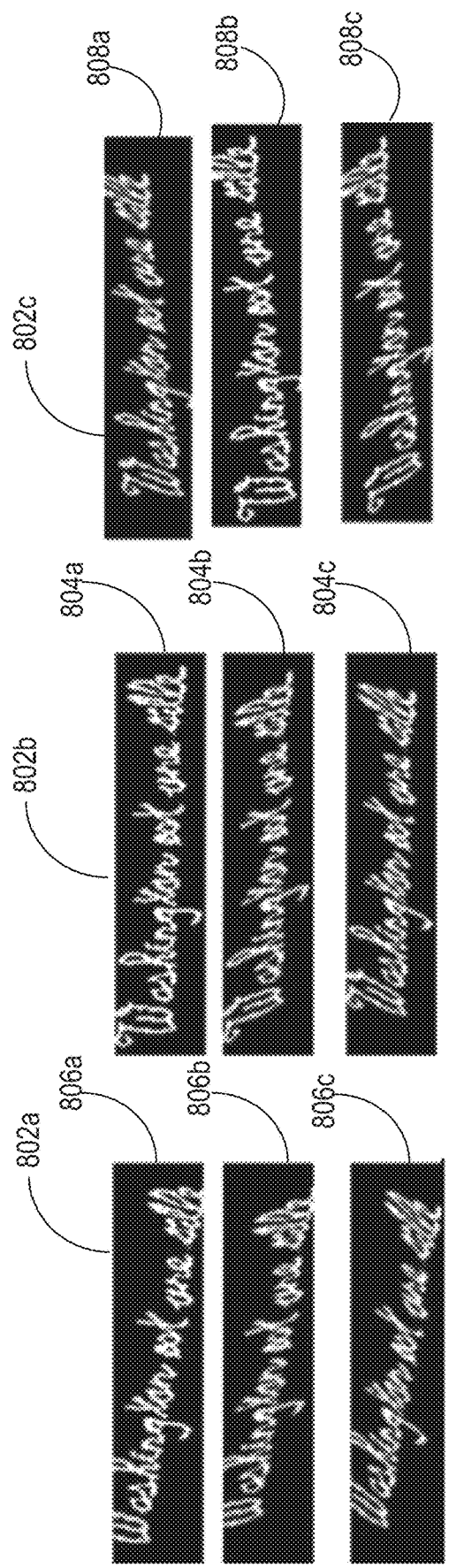
FIG. 8 illustrates augmented images for the training set.

FIG. 8 illustrates three columns of images 802a-c. Column 802b of FIG. 8 shows an original extracted handwriting image 804a. Below the original image 804a are two warped versions of the image 804b and 804c. Each image 804a-c is rotated left and right through 1-degree increments up to +/−8-degrees in various embodiments. The left and right rotations of the images 804a-c are shown in the left and right columns as images 806a-c and 808a-c respectively. One or more of the enhanced images 804b-c, 806a-c, and 808a-c, generated by the original image 802a, may be included in a training set for a model configured to recognize handwriting.

Some embodiments utilize a Speeded Up Robust Features (SURF) algorithm to identify key points in the training set. With this approach, key points are selected to create a visual "bag-of-words" which is used in a Support Vector Machine to distinguish language classes. This approach works well considering the SURF algorithm is an "off-the-shelf" algorithm that has no specific customization for handwriting language recognition.

FIG. 9 lists feature tokens detected in handwriting and used to build n-gram feature vector histograms. In various embodiments, to classify the language, almost 100 individual features were used to capture the uniqueness of each language. For example, the French phrase, "Où dans la forêt le garçon étudiant naïf?" illustrates all five French accent marks: 1) grave; 2) circumflex; 3) cedilla; 4) acute; and 5) umlaut. The appearance of these marks are detected and encoded as features. Each feature was assigned a number. Detectors were designated for each of features. There were other features such as a unique arrangement of circles and lines found in Korean, "제 눈에 안경이다", ("beauty is in the eye of the beholder"), the curves of Arabic, "اصبر تنل", ("be patient"), the multiple orthogonal intersections of Chinese, "凡钟情" ("love at first sight"), and so on for Japanese, Urdu, Persian, Bengali, Hindu, Portuguese, Russian, Swahili, Tamil, Telugu, and Turkish.

Once each feature was detected and encoded into a number, the language classification process could start using the encoded numbers. In an embodiment, one approach was based on the successful Kavnar and Trenkel technique used on characters, not handwriting, where histograms of n-grams are formed to create a language profile. An n-gram is an occurrence of two-features together. The letters 'th' are the most common character bi-gram in English. The language profile vector of n-gram normalized counts is developed during training and stored for each language. During testing, n-gram profile test vectors of the test document are compared to the stored profile vectors. The "closest match" is the reported language. There have been multiple proposals for measuring the distance between the profile vector and the test vector.

In various embodiments, n-grams were formed using the feature numbers. A profile n-gram histogram vector was created for each language during training. N-gram test vectors were compared to the profile n-gram histogram vector during testing to estimate the language by choosing the profile vector that is the best match to the test vector.

Various experiments showed this was a viable technique which could learn a language profile and match the language profile against features extracted from never-before-seen data. This technique may involve coding the individual feature detectors which may be complex.

Deep learning convolutional neural nets (CNN) do not require the language expertise to know which features most likely differentiate handwriting systems. Instead, the deep network may learn the unique characteristics of each language such as the unique L'accent marks in French and the inverted question marks (¿) in Spanish. The deep CNN removes the need for two types of developers: 1) one or more language specialists that know the peculiarities and distinguishing features of each language; and 2) one or more computer specialists to code the feature detectors.

This seemingly large gain in automation does not come without a price. A new kind of specialist is needed to organize and feed the deep net a large dataset of training examples. The deep net cannot learn to generalize without many, many examples. This has its price too. In some cases, for rare and or vanishing languages it is difficult to obtain a sufficiently large set of handwritten samples for training.

The results shown in the confusion matrices for each of the three methods evaluated are on a per word or small phrase basis. If all the handwritten words in the document are from the same language, additional accuracy may be achieved by implementing a majority voting scheme. Assume that the accuracy of each language class is p, and all the miss-classification error probabilities are the same, then the Pcorrect of a majority voting scheme over n-words, is given by the binomial equation:

$$Pcorrect = \sum_{k>n/2}^{n} \binom{n}{k} p^k (1-p)^{n-k}$$

The majority voting scheme can yield substantial improvement.

Figure 10:
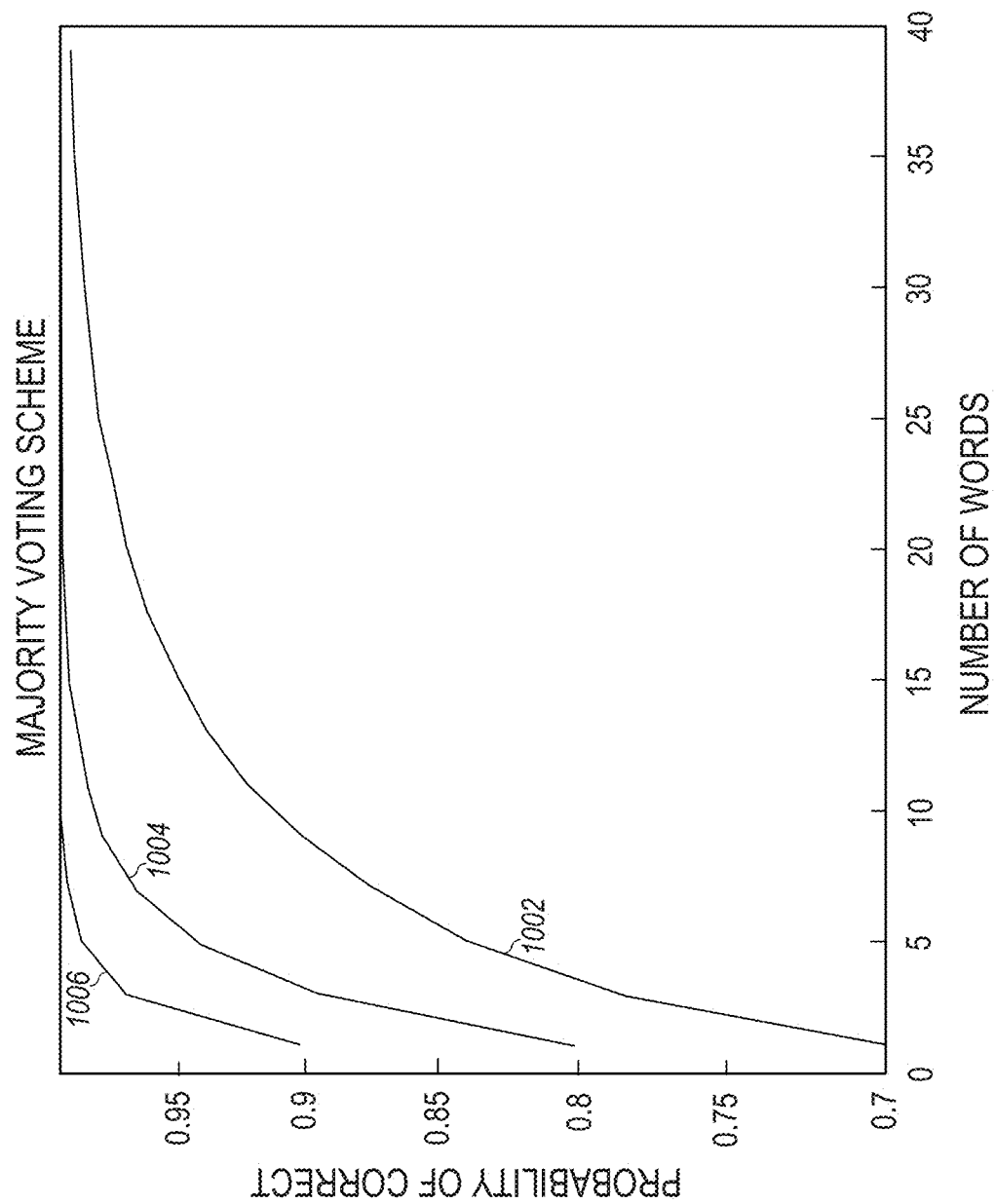
FIG. 10 is a graph showing the document language classification accuracy improved via majority voting.

FIG. 10 is a graph showing how a portion size of a document necessary to accurately classify, via a classifier, a language of the document varies based on a per word accuracy of the classifier. The demonstrated accuracy uses a majority voting scheme, where a classification of each word in the document receives one vote as to the language included in the document. FIG. 10 shows different accuracy curves 1002, 1004, and 1006 for per-word accuracy probabilities of 0.7, 0.8, and 0.9 respectively. For example, FIG. 10 shows that a per-word classification accuracy of 0.7 results in an overall document accuracy of 0.95 after 15 words of input when using a majority voting scheme.

Detection, extraction, and classification of handwriting language may be a pre-requisite to Handwriting Character Recognition (HCR). Various embodiments describe a scalable prototype system that accomplishes these tasks. Deep learning algorithms are used for both the page layout and language classification tasks. The deep learning language classification performance was compared to more conventional SURF bag-of-words features with an SVM classifier and to a novel bigram handwritten feature representation with a nearest neighbor classifier. Development of the custom features may be useful in those cases where there is insufficient data to fully train the other machine learning approaches.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 11:
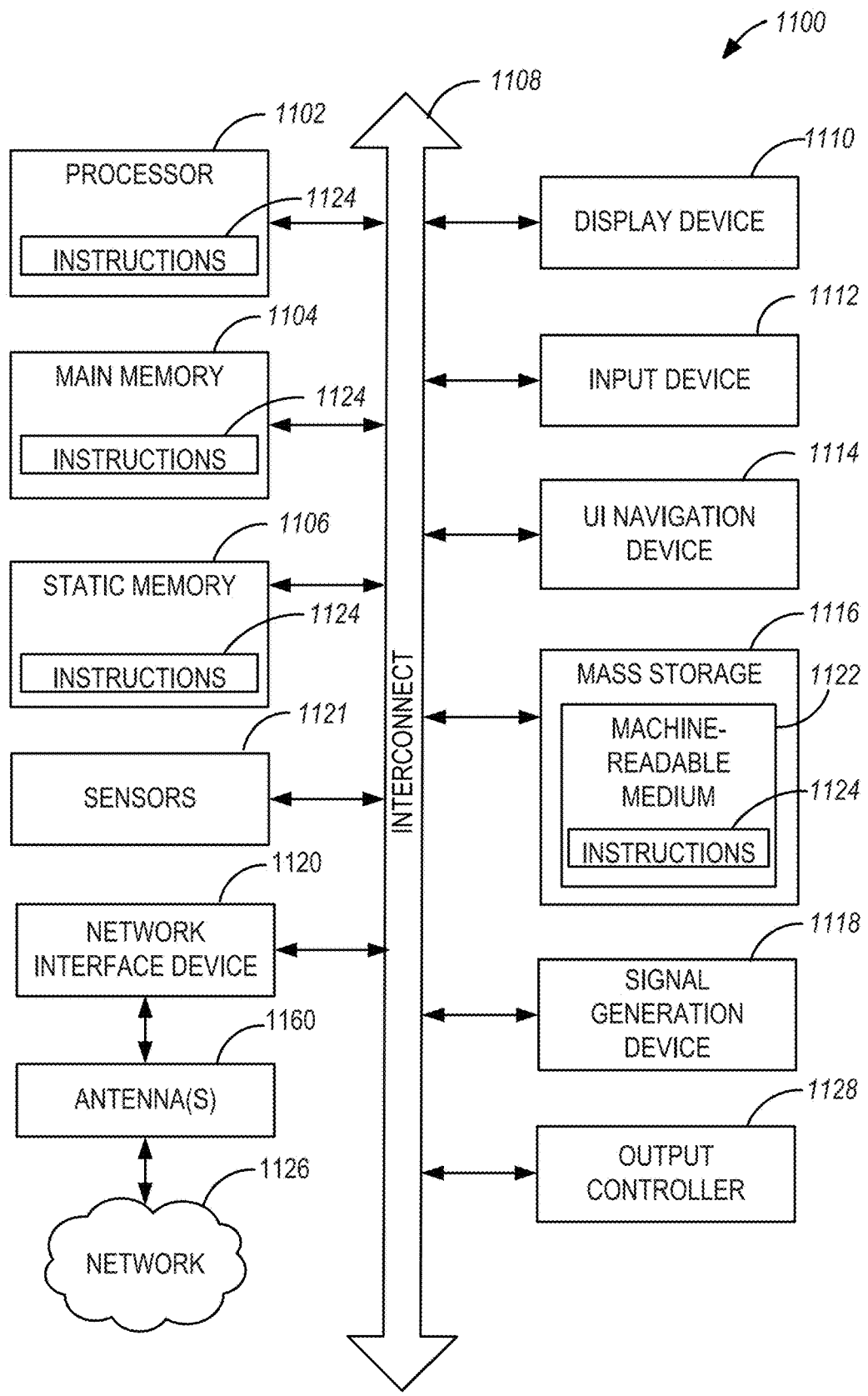
FIG. 11 illustrates, by way of example, a block diagram of an embodiment of a machine on which one or more of the methods, such as those discussed herein, can be implemented.

FIG. 11 illustrates a block diagram of an example machine 1100 upon which any one or more of the techniques (e.g., methodologies) discussed herein may perform. Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108.

Specific examples of main memory 1104 include Random Access Memory (RAM), and semiconductor memory devices, which may include, in some embodiments, storage locations in semiconductors such as registers. Specific examples of static memory 1106 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1100 may further include a display device 1110, an input device 1112 (e.g., a keyboard), and a user interface (UI) navigation device 1114 (e.g., a mouse). In an example, the display device 1110, input device 1112 and UI navigation device 1114 may be a touch screen display. The machine 1100 may additionally include a mass storage (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1102 and/or instructions 1124 may comprise processing circuitry and/or transceiver circuitry.

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1122 is illustrated as a single medium, the term "machine readable medium" may include a single medium or multiple media (e.g., a centralized or distributed database, and/or associated caches and servers) configured to store the one or more instructions 1124.

An apparatus of the machine 1100 may be one or more of a hardware processor 1102 (e.g., a central processing unit (CPU), a graphics processing unit (GPU), a hardware processor core, or any combination thereof), a main memory 1104 and a static memory 1106, sensors 1121, network interface device 1120, antennas 1160, a display device 1110, an input device 1112, a UI navigation device 1114, a mass storage 1116, instructions 1124, a signal generation device 1118, and an output controller 1128. The apparatus may be configured to perform one or more of the methods and/or operations disclosed herein. The apparatus may be intended as a component of the machine 1100 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1120 may include one or more physical jacks (e.g., Ethernet, coaxial, or phone jacks) or one or more antennas to connect to the communications network 1126. In an example, the network interface device 1120 may include one or more antennas 1160 to wirelessly communicate using at least one of single-input multiple-output (SIMO), multiple-input multiple-output (MIMO), or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the machine 1100, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 12:
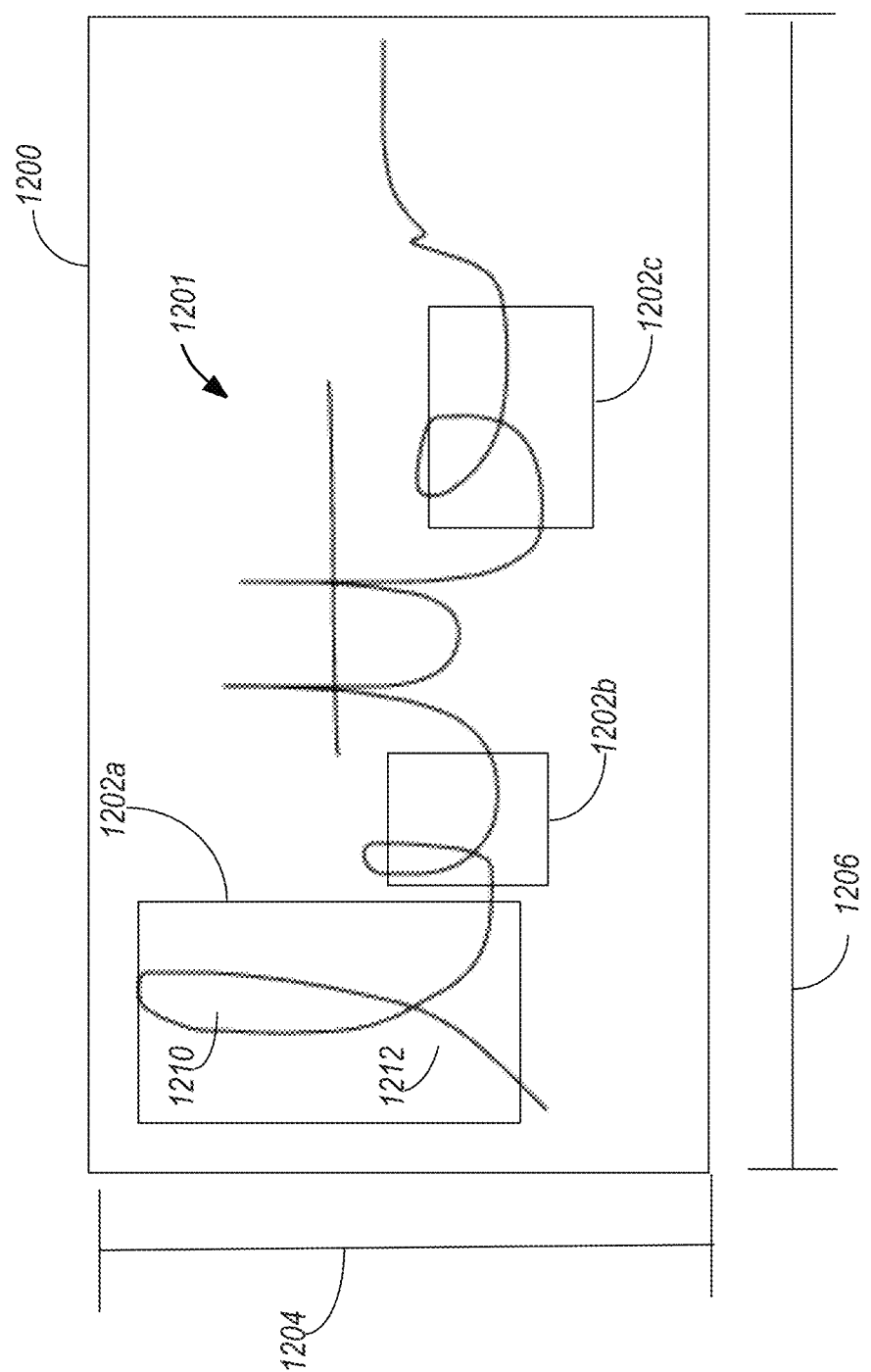
FIGS. 12-16 show examples of geometric features that may be detected by one or more of the disclosed embodiments.

FIGS. 12-16 show examples of geometric features that may be detected by one or more of the disclosed embodiments. FIG. 12 shows a bounding box 1200 around some handwriting 1201. The handwriting 1201 may be detected within an image of a document (e.g. 302). FIG. 12 shows that three loops 1202*a-c* have been detected within the bounding box 1200 by one or more of the disclosed embodiments. The loops may be detected, in some aspects, by, for example, identifying that white space within the loops such as white space 1210, has no contiguous path to white space 1212. In some aspects, circular and/or Elliptical Hough transforms may be utilized to detect one or more of the loops 1202*a-c*.

FIG. 12 also shows that the bounding box 1200 includes a height 1204 and a length 1206. The height 1204 and length 1206 may be used by some of the disclosed embodiments to adjust for a scale of the handwriting 1201, as explained further below.

Figure 13:
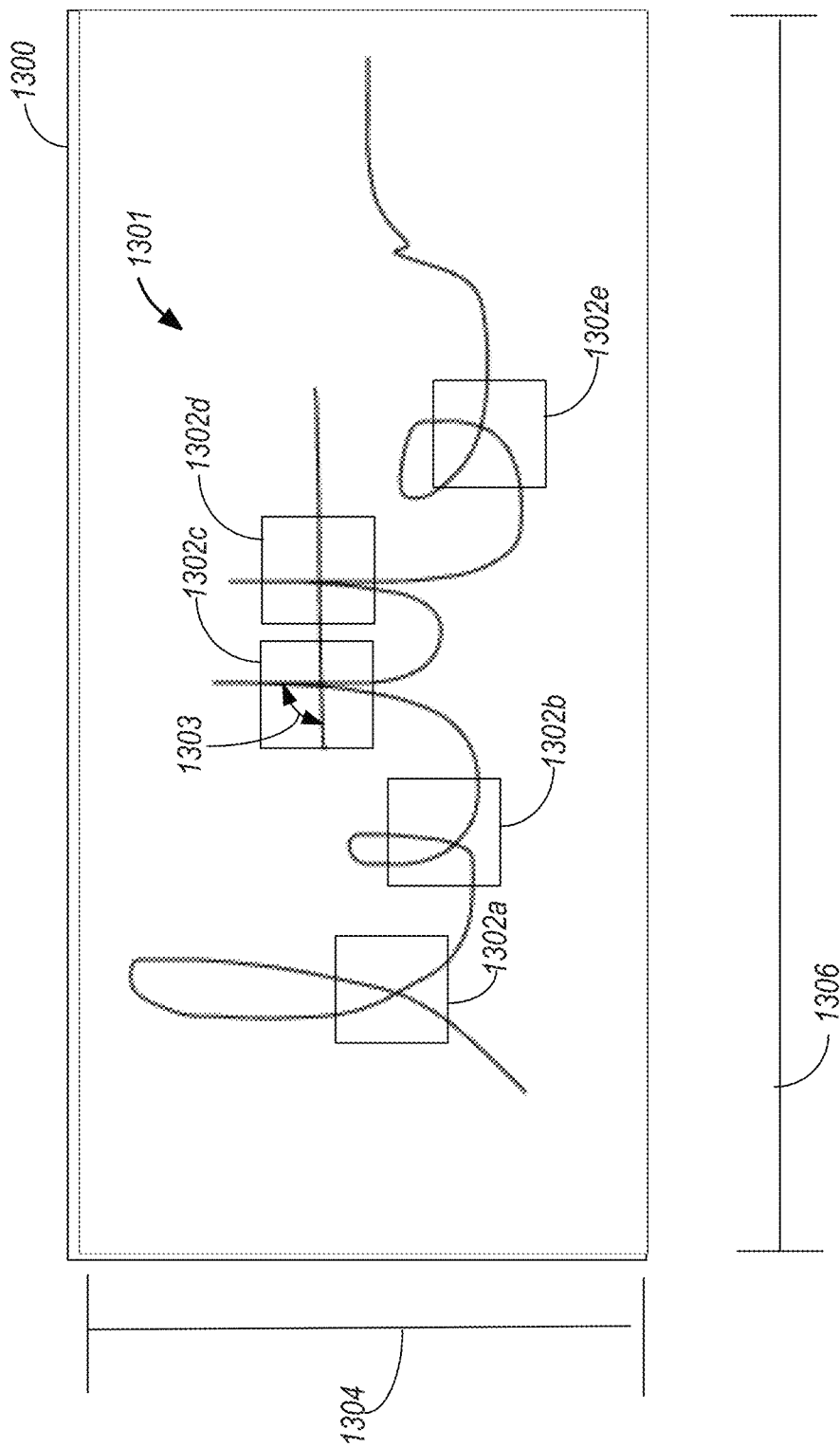

FIG. 13 shows examples of geometric features that may be detected by one or more of the disclosed embodiments. FIG. 13 shows a bounding box 1300 around handwriting 1301. The handwriting 1301 may be detected within an image of a document (e.g. 302). FIG. 13 shows that five line intersections 1302*a-e* have been detected within the bounding box 1300 by one or more of the disclosed embodiments. The intersections may be detected, in some aspects, by, for example, identifying angles made by linear line segments, such as the angle 1303. FIG. 13 also shows that the bounding box 1300 includes a height 1304 and a length 1306. The height 1304 and length 1306 may be used by some of the disclosed embodiments to adjust for a scale of the handwriting 1301, as explained further below. For example, the geometric features detected by the disclosed embodiments may be "topological"—in that they remain true or invariant of an orientation or size of the image.

Figure 14:
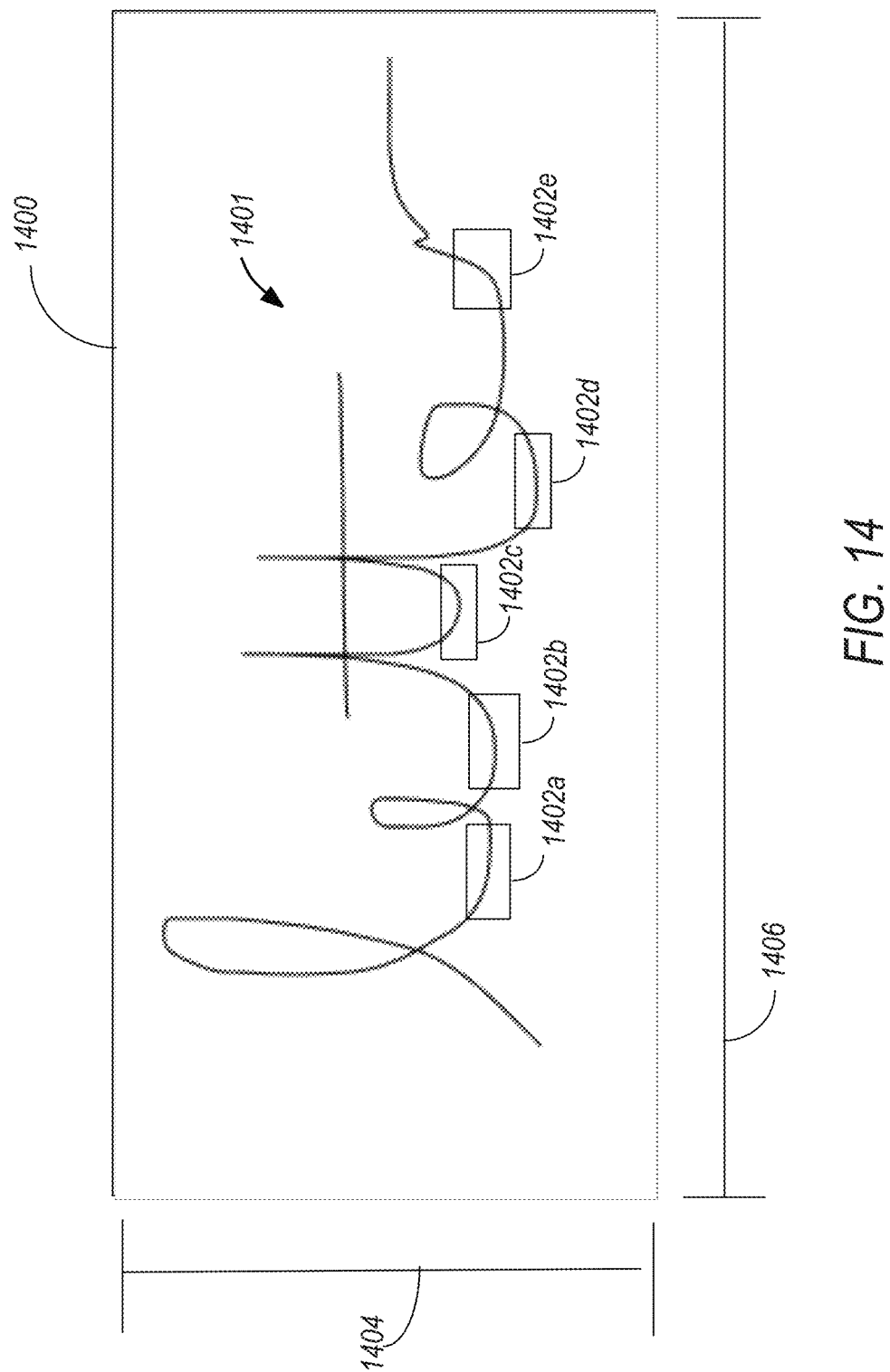

FIG. 14 shows examples of geometric features that may be detected by one or more of the disclosed embodiments. FIG. 14 shows a bounding box 1400 around handwriting 1401. The handwriting 1401 may be detected within an image of a document (e.g. 302). FIG. 14 shows that five curves 1402*a-e* have been detected within the bounding box 1400 by one or more of the disclosed embodiments. The curves may be detected, in some aspects, by, for example, identifying curved line segments that do not enclose white space. For example, the curve 1402 does not enclose the white space in the proximity of 1410. FIG. 14 also shows that the bounding box 1400 includes a height 1404 and a length 1406. The height 1404 and length 1406 may be used by some of the disclosed embodiments to adjust for a scale of the handwriting 1401, as explained further below.

Figure 15:
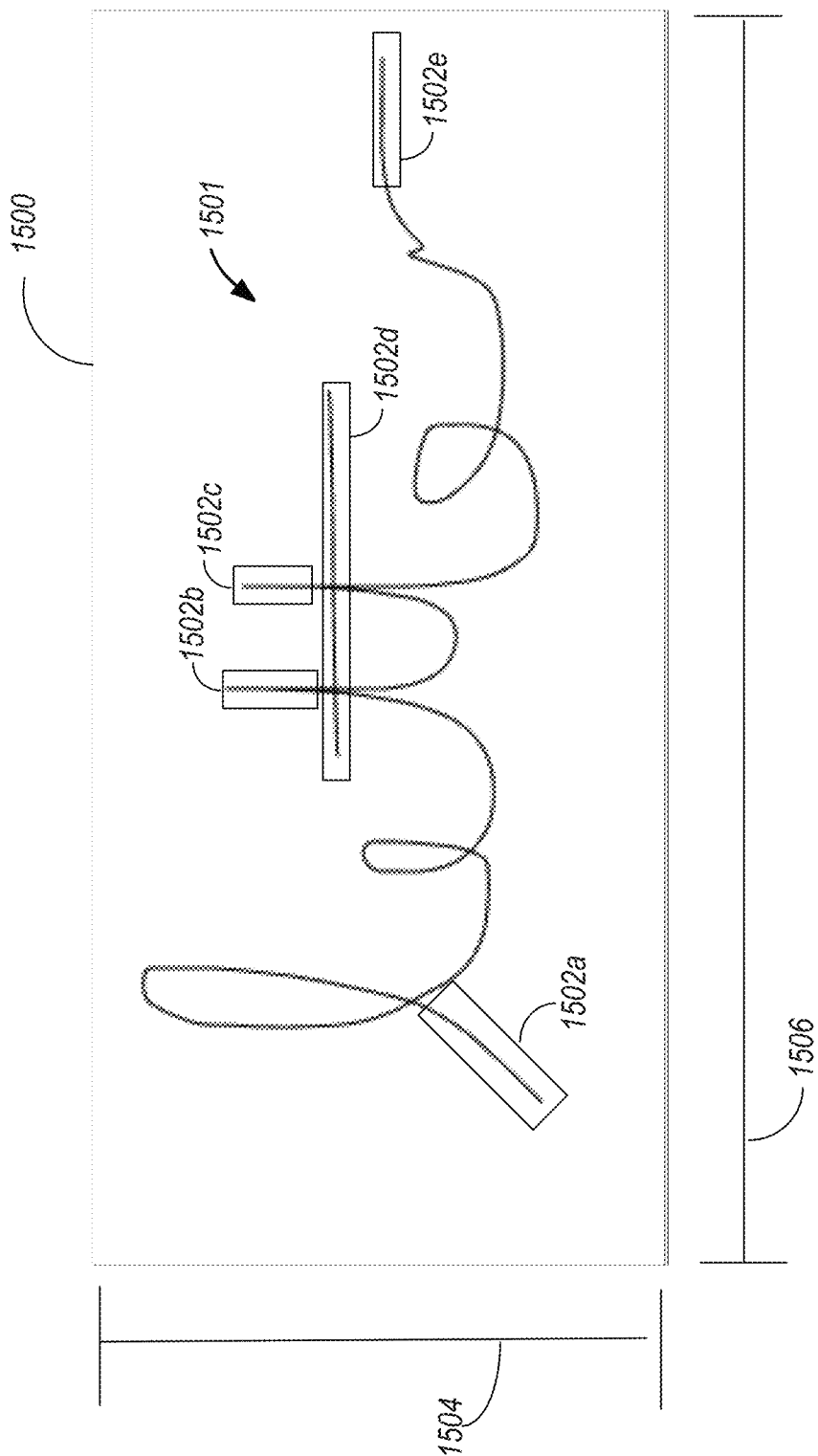

FIG. 15 shows examples of geometric features that may be detected by one or more of the disclosed embodiments. FIG. 15 shows a bounding box 1500 around handwriting 1501. The handwriting 1501 may be detected within an image of a document (e.g. 302). FIG. 15 shows that five line segments 1502*a-e* have been detected within the bounding box 1500 by one or more of the disclosed embodiments. The line segments 1502*a-e* may be detected via a variety of techniques. For example, in some aspects, a Hough transform may be used to detect the line segments 1502*a-e*. In other embodiments, a convolution based technique may be applied. For example convolution masks may be tuned to detect the presence of lines of a particular width and orientation.

FIG. 15 also shows that the bounding box 1500 includes a height 1504 and a length 1506. The height 1504 and length 1506 may be used by some of the disclosed embodiments to adjust for a scale of the handwriting 1501, as explained further below.

Figure 16:
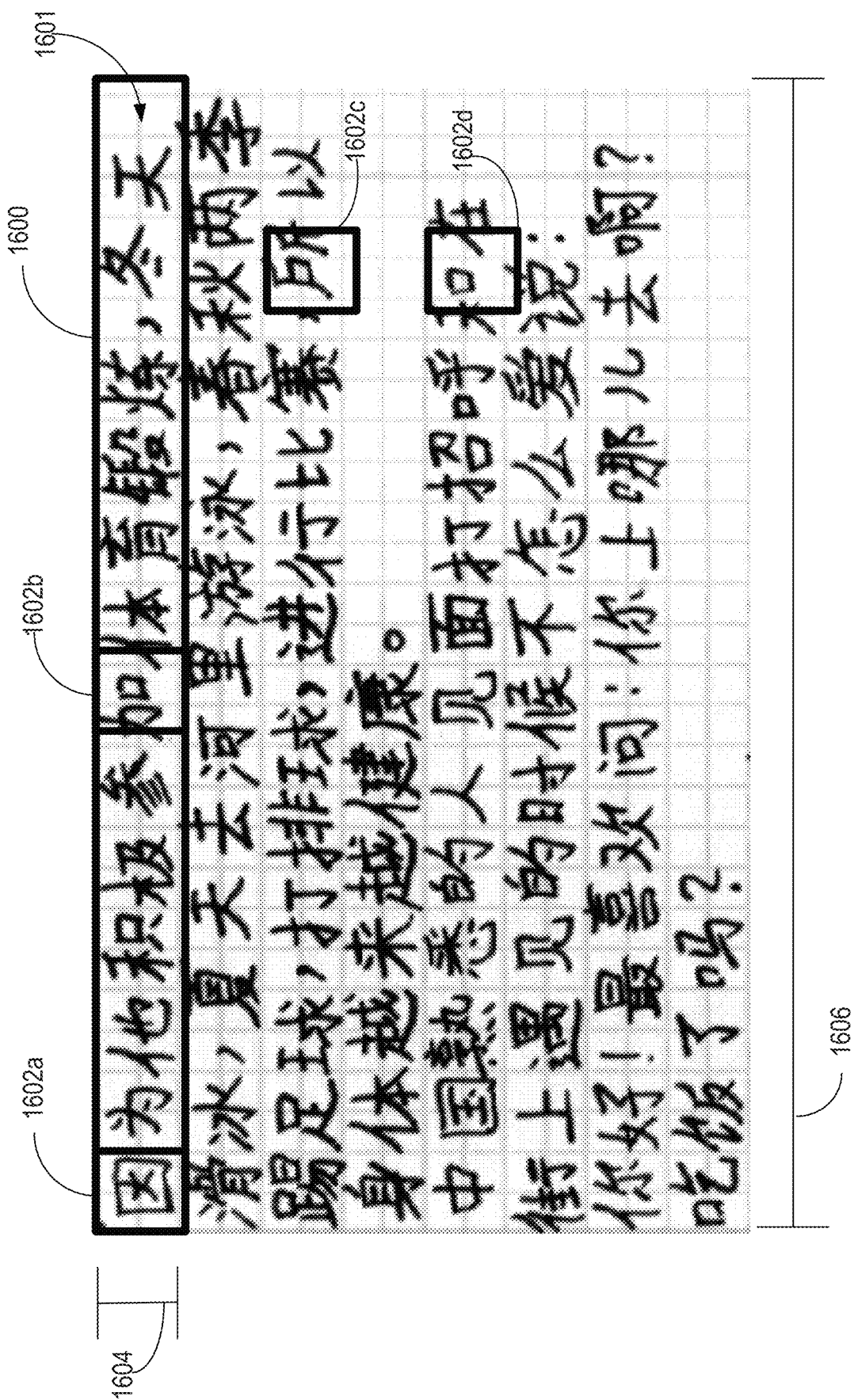

FIG. 16 shows examples of geometric features that may be detected by one or more of the disclosed embodiments. FIG. 16 shows a bounding box 1600 around handwriting 1601. The handwriting 1601 may be detected within an image of a document (e.g. 302). FIG. 16 shows that two boxes 1602*a-b* have been detected within the bounding box 1600 by one or more of the disclosed embodiments. The boxes 1602*a-b* may be detected via a variety of techniques.

For example, in some aspects, four corners of the box may be detected. The four corners form angles that satisfy particular conditions which may assist in detecting a box or rectangle. In some aspects, a Hough transform may be used to detect rectangles, squares, or other "boxes." In some other aspects. In other embodiments, a convolution-based technique may be applied. For example convolution masks may be tuned to detect the presence of lines of a particular width and orientation.

FIG. 16 also shows that the bounding box 1600 includes a height 1604 and a length 1606. As shown, the bounding box 1600 bounds one line of the handwriting shown in FIG. 16. Additional boxes or rectangles may be detected within the handwriting, such as rectangles 1602c and 1602d. The height 1604 and length 1606 may be used by some of the disclosed embodiments to adjust for a scale of the handwriting 1601, as explained further below.

Figure 17:
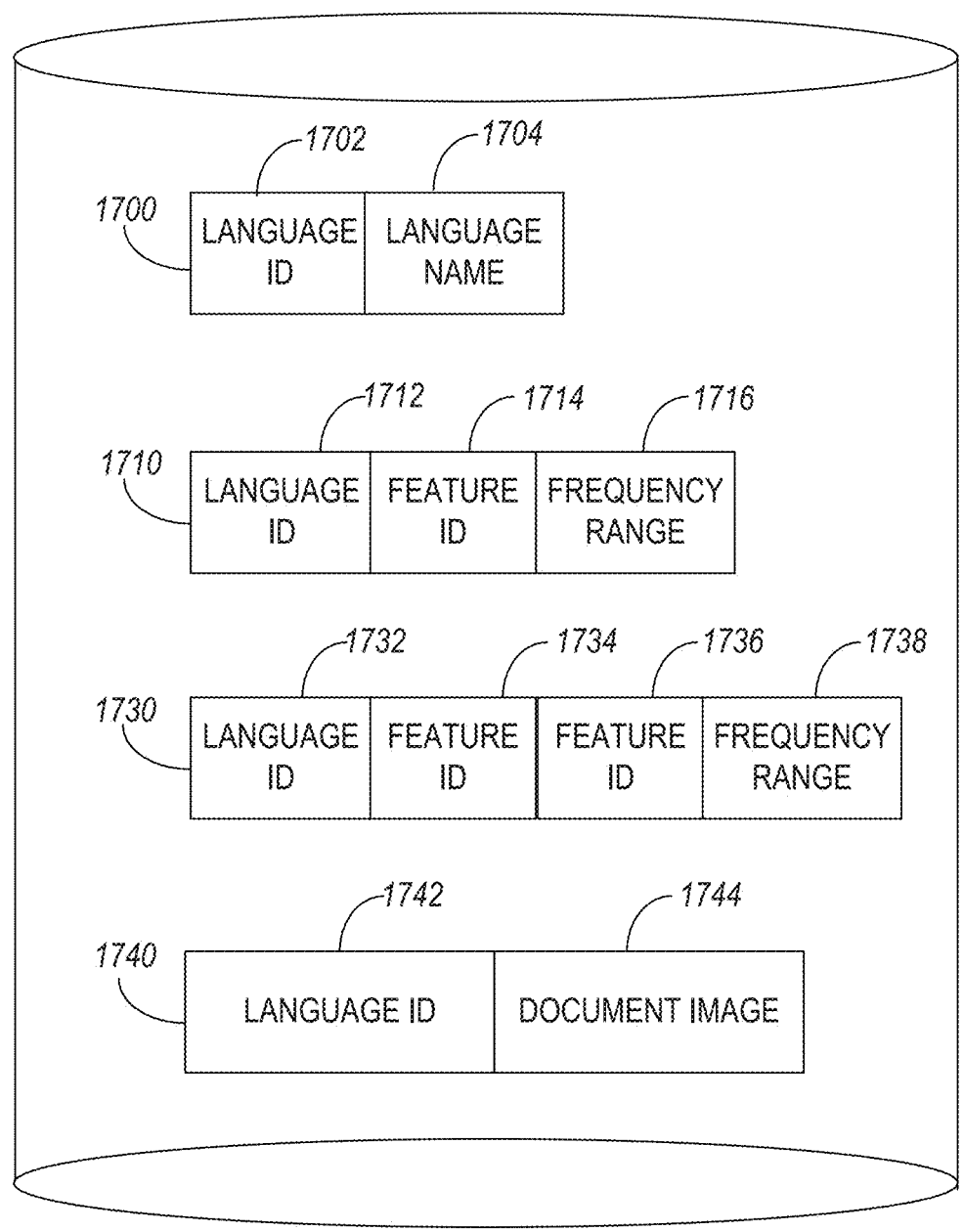
FIG. 17 shows example data structures that may be implemented in one or more of the disclosed embodiments.

FIG. 17 shows example data structures that may be implemented in one or more of the disclosed embodiments. While the data structures discussed below are described as relational database tables, one of skill would understand that various embodiments may utilize a variety of data structure types. For example, some embodiments may store data using an unstructured data store or traditional memory structures such as linked lists, queues, trees, or other data organizations.

FIG. 17 shows a language table 1700 a metric table 1710, and a hand writing data store 1740. The language table 1700 includes a language identifier field 1702 and a language name field 1704. The language identifier field 1702 uniquely identifies a language type. For example, the language identifier field 1702 may identify a language type such as English, Spanish, Simplified Chinese, German, Korean, Japanese, or any other language type. The language name field 1704 stores a "friendly" name of the language. The friendly name stored by the language name field 1704 may be displayed, for example, by a user interface. The feature frequency table 1710 includes a language identifier field 1712, a feature identifier field 1714, and a frequency range field 1716. The language identifier field 1712 uniquely identifies a language type, and may be cross referenced with the language identifier field 1702, discussed above with respect to the language table 1700. The feature identifier field 1714 uniquely identifies a particular geographic feature identified by the disclosed embodiments. For example, the feature identifier field 1714 may identify one of a loop, line segment, line intersection, rectangle, square, curve, orthogonal intersection, cross-over, corner, closed curve, or connected curve. The frequency range field 1716 stores a range for the metric identified by the metric identifier field 1714 that is characteristic of a language type identified by the language identifier field 1712. The feature frequency table 1710 may be used to define multiple language "histograms" for a plurality of language types. The histograms defined by the feature frequency table 1710 may be used to identify a language type for a particular handwriting sample in some aspects.

The adjoining feature table 1730 includes a language identifier field 1732, first feature identifier field 1734, second feature identifier field 1736, and a frequency range field 1738. The language identifier field 1732 uniquely identifies a language type, and may be cross referenced with any of the language identifier fields 1712, 1742 (below), or 1702. The first and second feature identifier fields 1734 and 1736 identify separate features. The frequency range field 1738 identifies a frequency with which the two features 1734 and 1736 occur in an adjoining fashion within samples of the language type identified by language type field 1732.

The handwriting data store 1740 includes a language identifier field 1742 and a document image field 1744. The language identifier field 1742 uniquely identifies a language type, and may be cross referenced with the language identifier fields 1702 and/or 1712. The document image field 1744 stores a document image. The document image includes a handwriting sample of the language type identified by the field 1742.

Figure 18:
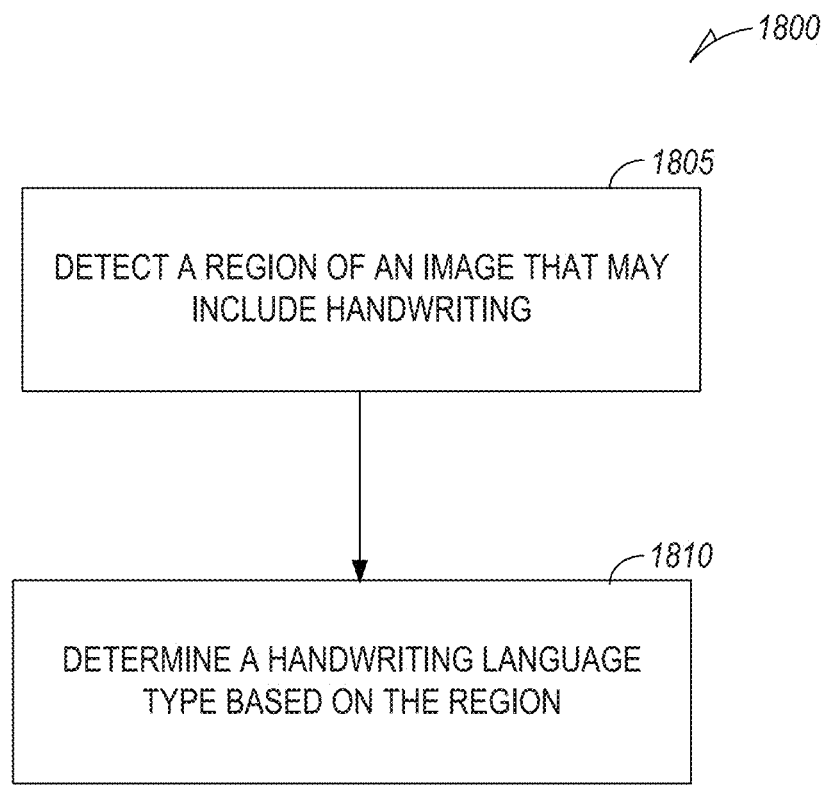
FIG. 18 is a flowchart of a process 1800 for identifying a handwriting language type.

FIG. 18 is a flowchart of a process 1800 for identifying a handwriting language type. In some aspects one or more of the functions discussed below with respect to FIG. 18 may be performed by hardware processing circuitry. For example, instructions 1124 stored in a memory, such as one or more hardware memories (e.g. 1104 and/or 1106), configure the hardware processor 1102 to perform one or more of the functions discussed below with respect to FIG. 18.

In operation 1805, a region of an image that may include handwriting is detected. For example, in some aspects of operation 1805, an entire page of a document may be analyzed to identify regions that have a higher probability of including handwriting than other regions on the page. In some aspects, the entire page may be scanned to identify features on the page. In some aspect, the image may be processed with a color filter, such as a blue filter, before analyzing the image. In some aspects, the image may be processed to enhance a contrast of the image before analyzing the image.

In some aspects, the features may be identified by detecting edges. Edges may be detected by detecting a boundary (or edge) between two image regions. In some aspects, convolution with small edge-like masks may be used for feature identification. Gradient magnitudes of regions on the page may be computed, with edges including those regions having the highest gradient magnitude. In some aspects, features may be detected based on limits of the shape, smoothness or gradient value of the features.

Operation 1805 may then detect features arranged in a linear fashion within the image. In some aspects, linear features may be detected via a probabilistic Hough transform. Once linear features are detected, the linear features may be further analyzed to determine a probability that the linear features include handwriting. In some aspects, linear features may be analyzed to measure their irregularity. As handwriting tends to be irregular in shape, linear features that are also irregular have a higher probability of being handwriting than linear features that are more structured or uniform. In some aspects, an irregularity measurement of the linear features may be based on Equation (1) below:

$$IR(s) = \frac{\max\left(\sqrt{(x_i - \bar{x})^2 + (y_i - \bar{y})^2}\right)}{\min\left(\sqrt{(x_i - \bar{x})^2 + (y_i - \bar{y})^2}\right)} \quad (1)$$

Equation 1 above defines a ratio between a radius of a maximum circle enclosing the region and a maximum circle that can be contained in the region.

In some aspects, if the irregularity of the features in the linear set of features is above a threshold, the disclosed embodiments may determine that the linear set or group of features is likely enough to be handwriting, that additional analysis may be applied to the linear set of features. In some aspects, a probability that the linear features represent handwriting is based, at least in part, on a measurement of the irregularity of the features, such as via Equation 1 above.

In operation 1810, a handwriting language type is determined based on the linear features or region. In some aspects, operation 1810 determines a frequency of geometric shapes within a region bounding the linear features. For example, in some aspects, a bounding box is defined for the linear features of operation 1805. In some aspects, a bounding box for the linear features may be determined based on a rotating calipers method. The rotating calipers method identifies a minimum area or minimum perimeter bounding box of a two-dimensional convex polygon of a two-dimensional point set. The two-dimensional point set may be coordinates of each of the linear features identified in operation 1805.

Operation 1810 may then determine a ratio between a height and a length of the bounding box. In some aspects, the height may be determined to be a shorter of two dimensions of the bounding box and the length determined to the longer of the two dimensions. In some other aspects, the features may be analyzed to identify periodic linearity within the linear features. A height of the bounding may be determined to be parallel with periodic linearity within the linear features. In some other aspects, the height and length of the bounding box may be determined based on a page on which the features bounded by the bounding box are located. For example, a determination of height and length of the bounding box may be consistent with a portrait or landscape orientation of the page.

Option 1810 may then detect geometric features formed by features within the bounding box. Operation 1810 may detect one or more of loops, line segments, line crossings, line curves, orthogonal intersections, rectangles, squares, polygons, or other geometric features within the bounding box, as described above for example with respect to FIGS. 12-16. Operation 1810 may also detect a frequency of adjoining features within the bounding box. For example, operation 1810 may count a number of times two particular features are positioned next to or adjoining each other in the bounding box.

The counts of each type of geometric feature may then be normalized based on a ratio between the height and width of the bounding box. For example, in some aspects, each count of a particular type of geometric feature may be normalized to identify a frequency of the particular type of geometric feature. One or more of the frequencies may be generated according to:

$$\text{frequency} = \text{count} \ast \text{height}/\text{length} \quad (2)$$

The frequencies for the geometric features may then, in some aspects, be used to generate a histogram, the histogram indicating the frequencies for each of the geometric features. The histogram may be compared to other histograms for documents of known types, to determine which of the other histograms the histogram is most similar to. This may indicate the language of the handwriting.

Figure 19:
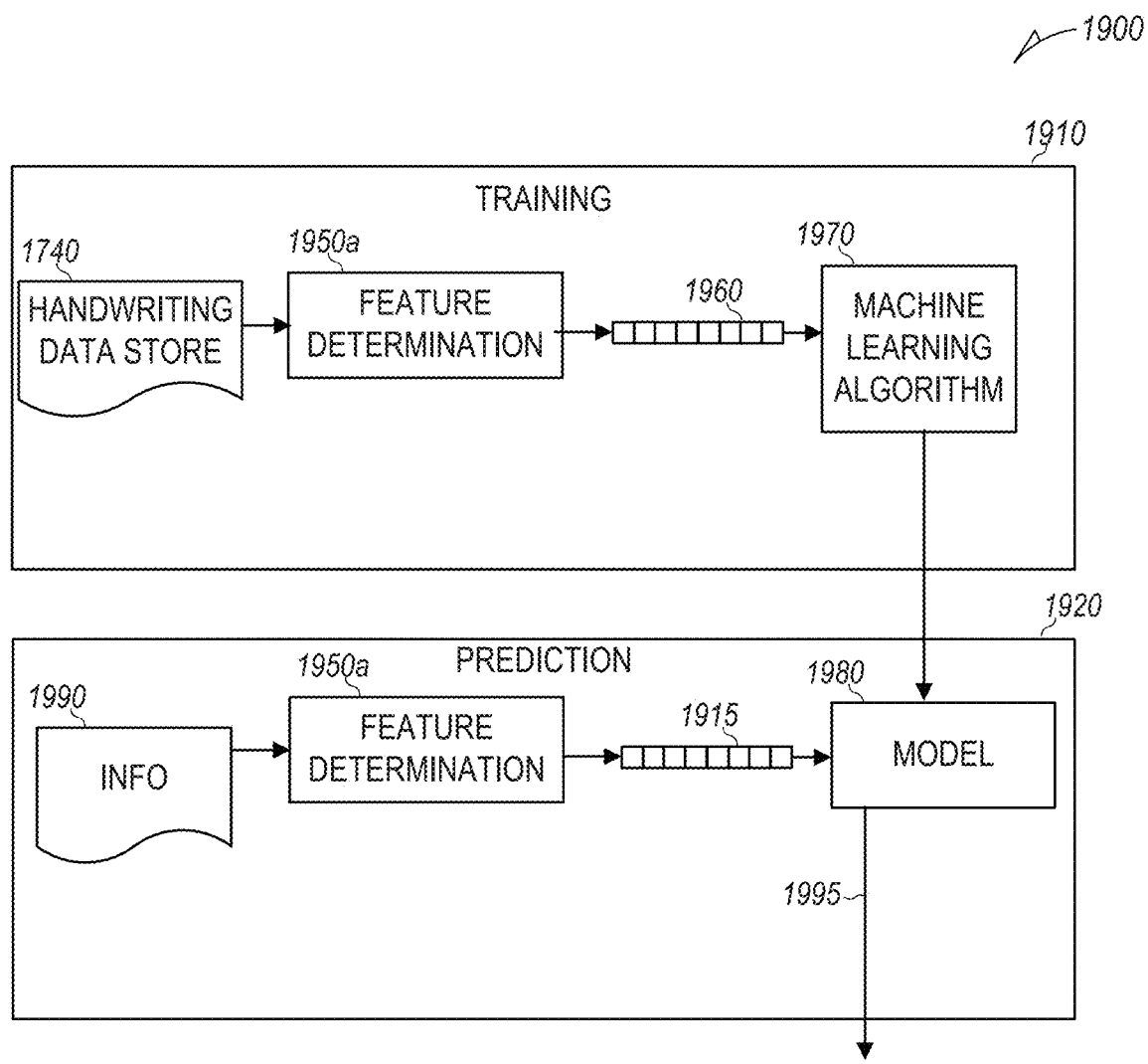
FIG. 19 shows an example machine learning module 1900 according to some examples of the present disclosure.

FIG. 19 shows an example machine learning module 1900 according to some examples of the present disclosure. Machine learning module 1900 utilizes a training module 1910 and a prediction module 1920. Training module 1910 inputs handwriting samples 1740 into feature determination module 1950a. The handwriting samples 1740 may be labeled (e.g. via field 1744).

Feature determination module 1950a determines one or more features 1960 from this handwriting data store 1740. Stated generally, features 1960 are a set of the information input and is information determined to be predictive of a particular outcome. In some examples, the features 1960 may be the handwriting samples provided by the handwriting data store 1740. In some aspects, the features 1960 may be frequencies metrics determined from the handwriting samples available in the handwriting data store 1740. For example, the frequencies metrics may indicate a frequency at which one or more geometric features occur in a handwriting sample. In some aspects, the frequency metrics may indicate a frequency at which two geometric features are adjoining within a handwriting sample. The machine learning algorithm 1970 produces a model 1980 based upon the features 1960 and the label(s).

In the prediction module 1920, information 1990 for a particular handwriting sample may be input to the feature determination module 1950. Feature determination module 1950b may determine the same set of features (e.g. frequency metrics) or a different set of features from the information 1990 as feature determination module 1950a determined from handwriting data store 1740. In some examples, feature determination module 1950a and 1950b are the same module. Feature determination module 1950b produces feature vector 1915, which is input into the model 1980 to generate a probability indicator that the information 1990 is of a particular language type. In some aspects, the model 1980 generates multiple probabilities, each probability indicating a probability that the information 1990 is of a particular language type. The training module 1910 may operate in an offline manner to train the model 1980. The prediction module 1920, however, may be designed to operate in an online manner. It should be noted that the model 1980 may be periodically updated via additional training and/or user feedback.

The machine learning algorithm 1970 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, hidden Markov models, models based on artificial life, simulated annealing, and/or virology. Examples of unsupervised learning algorithms include expectation-maximization algorithms, vector quantization, and information bottleneck method. Unsupervised models may not have a training module 1910. In an example embodiment, a regression model is used and the model 1980 is a vector of coefficients corresponding to a learned importance for each of the features in the vector of features 1960, 1915. To calculate a score, a dot product of the feature vector 1915 and the vector of coefficients of the model 1980 is taken.

In some aspects, one or more of the training module 1910 and/or prediction module 1920 may execute on hardware processing circuitry, such as the processor 1102 discussed above with respect to FIG. 11.

Figure 20:
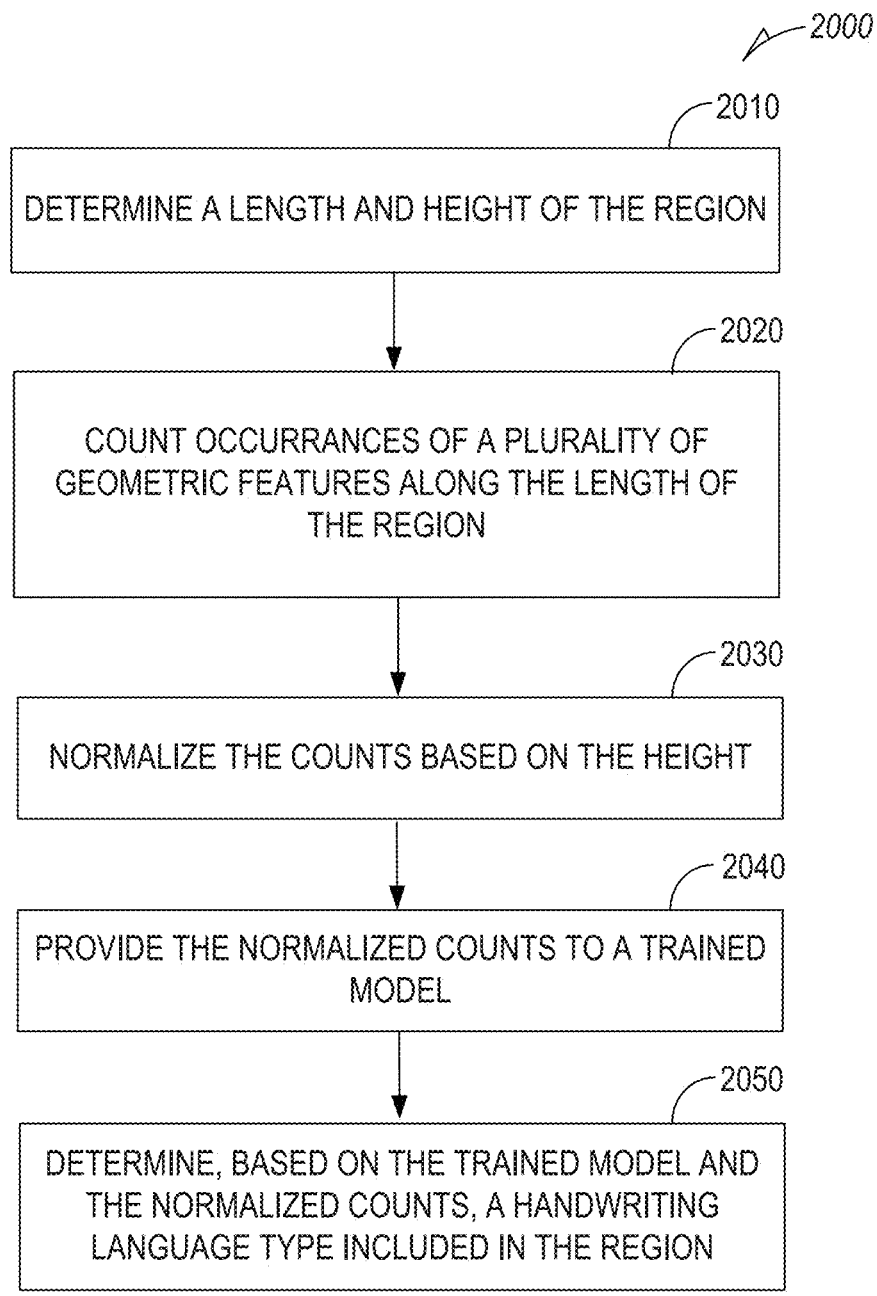
FIG. 20 is a flowchart of a process 2000 for identifying a handwriting language type.

FIG. 20 is a flowchart of a process 2000 for identifying a handwriting language type. In some aspects one or more of the functions discussed below with respect to FIG. 18 may be performed by hardware processing circuitry. For example, instructions 1124 stored in a memory, such as one or more hardware memories (e.g. 1104 and/or 1106), configure the hardware processor 1102 to perform one or more of the functions discussed below with respect to FIG. 20.

In operation 2010, a length and height of a region of an image is determined. The image may be of a document. The region may be a bounding box defined to substantially surround an area of an image having a probability of including handwriting. As discussed above with respect to operation 1705, some embodiments may analyze an image of a document and identify one or more regions in the image having a handwriting probability above a threshold. The length and height of the region are determined in operation 2010. In some aspects, operation 2010 determines the height of the region to be parallel to a direction of a majority of linear features in the region. For example, operation 2010 may analyze features within the region and identify linearity to groups of features in the region. Option 2010 may then determine a vector that a majority of the groups of features are aligned with. The height may be substantially parallel to this vector while the length may be substantially perpendicular with the vector.

Operation 2020 determines a count of geometric features occurring along the length of the region. For example, operation 2020 may analyze the region starting at a first side (defined along the length) and completing at a second side of the region (defined along the length). Operation 2020 may count how many of each type of geometric features is detected within the region.

In operation 2030, the counts are normalized based on the height. For example, as discussed above with respect to process 1800, the counts may be normalized according to equation 2 to define frequencies. Operation 2030 operates to adjust for different scales of handwriting.

In operation 2040, the normalized counts are provided to a trained model. For example, as discussed above with respect to FIG. 19, information 1990 is provided to a feature determination module 1950*b*, which may determine the normalized counts discussed above with respect to operations 2020 and 2030.

In operation 2050, a handwriting language type included in the region is determined. The language type is determined by the trained model based on the normalized counts. As discussed above, the normalized counts define frequencies of certain geometric features within the region. The geometric features may include one or more of loops, rectangles, squares, boxes, curves, orthogonal intersections, cross-overs, corners, closed curves, or connected curves.

In some aspects, the language type determination may define which of a plurality of algorithms the handwriting sample is provided to. For example, different algorithms may be developed to interpret hand writing for specific languages. Thus, if operation 2050 determines a handwriting sample is English, the handwriting sample may be provided to an algorithm designed to interpret English handwriting. If operation 2050 determine the handwriting sample is in Spanish, the handwriting sample may be provided to a second algorithms designed to interpret Spanish handwriting. In some aspects, the language type determination may control routing of the handwriting sample to different human analysts. For example, operation 2050 may send the handwriting sample to different email addresses based on the determined language type (with the different email addresses identifying different human analysts skilled at interpreting the different language types).

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Example 1 is a method performed by hardware processing circuitry, comprising: receiving an image; detecting a plurality of features in the image; detecting a subset of the plurality of features arranged linearly in the image; detecting a region of the image bounding the subset of features; determining a probability that the region includes handwriting; determining the probability is above a threshold; generating, based on the region, a plurality of metrics defining frequencies of geometric features within the region; providing, to a trained model, the plurality of metrics; and determining from the trained model, a language type of handwriting within the region.

In Example 2, the subject matter of Example 1 optionally includes enhancing contrast of the image, wherein the detecting of the features is based on the enhanced contrast.

In Example 3, the subject matter of any one or more of Examples 1-2 optionally include color filtering the image, wherein the detecting of the features is based on the enhanced contrast.

In Example 4, the subject matter of any one or more of Examples 1-3 optionally include determining an irregularity of features within the region, wherein the determination of the probability is based on the irregularity.

In Example 5, the subject matter of any one or more of Examples 1-4 optionally include wherein the generating of the plurality of metrics comprises determining a length and a height of the region, wherein a count of a geometric feature occurring along the length of the region is normalized based on the height of the region, the method further comprising generating a frequency of the geometric feature based on the normalized count.

In Example 6, the subject matter of any one or more of Examples 1-5 optionally include wherein the geometric features include one or more of line segments, boxes, curves, loops, orthogonal intersections, cross-overs, corners, closed curves, or connected curves.

In Example 7, the subject matter of any one or more of Examples 1-6 optionally include generating second metrics identifying frequencies of adjoining geometric feature pairs within the region, and providing the second metrics to the trained model.

In Example 8, the subject matter of any one or more of Examples 1-7 optionally include training the model based on a database of documents, metrics for the documents, and language type.

Example 9 is a non-transitory computer readable storage medium comprising instructions that when executed configure hardware processing circuitry to perform operations, comprising: receiving an image; detecting a plurality of features in the image; detecting a subset of the plurality of features arranged linearly in the image; detecting a region of the image bounding the subset of features; determining a probability that the region includes handwriting; determining the probability is above a threshold; generating, based on the region, a plurality of metrics defining frequencies of geometric features within the region; providing, to a trained model, the plurality of metrics; and determining from the trained model, a language type of handwriting within the region.

In Example 10, the subject matter of Example 9 optionally includes the operations further comprising enhancing contrast of the image, wherein the detecting of the features is based on the enhanced contrast.

In Example 11, the subject matter of any one or more of Examples 9-10 optionally include the operations further comprising color filtering the image, wherein the detecting of the features is based on the enhanced contrast.

In Example 12, the subject matter of any one or more of Examples 9-11 optionally include the operations further comprising determining an irregularity of features within the region, wherein the determination of the probability is based on the irregularity.

In Example 13, the subject matter of any one or more of Examples 9-12 optionally include wherein the generating of the plurality of metrics comprises determining a length and a height of the region, wherein a count of a geometric feature occurring along the length of the region is normalized based on the height of the region, the method further comprising generating a frequency of the geometric feature based on the normalized count.

In Example 14, the subject matter of any one or more of Examples 9-13 optionally include wherein the geometric features include one or more of line segments, boxes, curves, loops, orthogonal intersections, cross-overs, corners, closed curves, or connected curves.

In Example 15, the subject matter of any one or more of Examples 9-14 optionally include the operations further comprising generating second metrics identifying frequencies of adjoining geometric feature pairs within the region, and providing the second metrics to the trained model.

In Example 16, the subject matter of any one or more of Examples 9-15 optionally include the operations further comprising training the model based on a database of documents, metrics for the documents, and language type.

Example 17 is a system, comprising: hardware processing circuitry; one or more hardware memories storing instructions that when executed configure the hardware processing circuitry to perform operations comprising: receiving an image; detecting a plurality of features in the image; detecting a subset of the plurality of features arranged linearly in the image; detecting a region of the image bounding the subset of features; determining a probability that the region includes handwriting; determining the probability is above a threshold; generating, based on the region, a plurality of metrics defining frequencies of geometric features within the region; providing, to a trained model, the plurality of metrics; and determining from the trained model, a language type of handwriting within the region.

In Example 18, the subject matter of Example 17 optionally includes wherein the generating of the plurality of metrics comprises determining a length and a height of the region, wherein a count of a geometric feature occurring along the length of the region is normalized based on the height of the region, the method further comprising generating a frequency of the geometric feature based on the normalized count.

In Example 19, the subject matter of any one or more of Examples 17-18 optionally include wherein the geometric features include one or more of line segments, boxes, curves, loops, orthogonal intersections, cross-overs, corners, closed curves, or connected curves.

In Example 20, the subject matter of any one or more of Examples 17-19 optionally include the operations further comprising generating second metrics identifying frequencies of adjoining geometric feature pairs within the region, and providing the second metrics to the trained model.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

What is claimed is:

1. A method performed by hardware processing circuitry, comprising:
    receiving an image;
    identifying handwriting in the image by:
        detecting a plurality of features in the image;
        detecting a subset of the plurality of features arranged linearly in the image;
        detecting a region of the image bounding the subset of plurality of features;
        determining a probability that the region includes handwriting; and
        determining the probability is above a threshold resulting in identification of handwriting; and
    responsive to the identification of handwriting, identifying a language type of the handwriting; and
        generating, based on the region, a plurality of geometric metrics defining frequencies of geometric features within the region, the geometric features including three or more of:
    line segments, boxes, curves, loops, orthogonal intersections, cross-overs, corners, closed curves, or connected curves;
        providing, to a trained model, the plurality of geometric metrics; and
        determining from the trained model, the language type of handwriting within the region.

2. The method of claim 1, further comprising enhancing contrast of the image resulting in a contrast enhanced image, wherein the detecting of the plurality of features is based on the contrast enhanced image.

3. The method of claim 2, further comprising color filtering the image to remove non-blue colors resulting in a color-filtered image, wherein the detecting of the plurality of features is based on the color-filtered image.

4. The method of claim 1, wherein determining the probability that the region includes handwriting includes determining an irregularity of the subset of the plurality of features within the region, wherein the determination of the probability is based on the irregularity, the irregularity determined based on a radius of a first circle that encloses the region and a maximum radius of a second circle that is contained within the region.

5. The method of claim 1, wherein the generating of the plurality of geometric metrics comprises determining a length and a height of the region, wherein a count of a geometric feature of the geometric features occurring along the length of the region is normalized based on the height and the length of the region, the method further comprising generating a frequency of the geometric feature based on the normalized count.

6. The method of claim 1, wherein the geometric features include line segments, boxes, curves, loops, orthogonal intersections, cross-overs, corners, closed curves, and connected curves.

7. The method of claim 1, further comprising generating second geometric metrics identifying frequencies of adjoining geometric feature pairs within the region, and providing the second geometric metrics to the trained model.

8. The method of claim 1, further comprising training the model based on a database of documents, document metrics for the documents, and the language type of the document.

9. A non-transitory computer readable storage medium comprising instructions that when executed configure hardware processing circuitry to perform operations, comprising:
   receiving an image;
   identifying handwriting in the image by:
      detecting a plurality of features in the image;
      detecting a subset of the plurality of features arranged linearly in the image;
      detecting a region of the image bounding the subset of the plurality of features;
      determining a probability that the region includes handwriting; and
      determining the probability is above a threshold resulting in identification of handwriting; and
   responsive to the identification of handwriting, identifying a language of the handwriting by:
      generating, based on the region, a plurality of geometric metrics defining frequencies of geometric features within the region, the geometric features including three or more of:
   line segments, boxes, curves, loops, orthogonal intersections, cross-overs, corners, closed curves, or connected curves;
      providing, to a trained model, the plurality of geometric metrics; and
      determining from the trained model, the language type of handwriting within the region.

10. The non-transitory computer readable storage medium of claim 9, the operations further comprising enhancing contrast of the image resulting in an enhanced contrast image, wherein the detecting of the plurality of features is based on the enhanced contrast image.

11. The non-transitory computer readable storage medium of claim 9, the operations further comprising color filtering the image to remove non-blue blue colors resulting in a color-filtered image, wherein the detecting of the plurality of features is based on the color-filtered image.

12. The non-transitory computer readable storage medium of claim 9, wherein determining the probability that the region includes handwriting includes determining an irregularity of the subset of the plurality of features within the region, wherein the determination of the probability is based on the irregularity, the irregularity determined based on a radius of a first circle that encloses the region and a maximum radius of a second circle that is contained within the region.

13. The non-transitory computer readable storage medium of claim 9, wherein the generating of the plurality of geometric metrics comprises determining a length and a height of the region, wherein a count of a geometric feature of the geometric features occurring along the length of the region is normalized based on the height and the length of the region, the method further comprising generating a frequency of the geometric feature based on the normalized count.

14. The non-transitory computer readable storage medium of claim 9, wherein the geometric features include line segments, boxes, curves, loops, orthogonal intersections, cross-overs, corners, closed curves, and connected curves.

15. The non-transitory computer readable storage medium of claim 9, the operations further comprising generating second geometric metrics identifying frequencies of adjoining geometric feature pairs within the region, and providing the second geometric metrics to the trained model.

16. The non-transitory computer readable storage medium of claim 9, the operations further comprising training the model based on a database of documents, document metrics for the documents, and the language type of the document.

17. A system, comprising:
   hardware processing circuitry;
   one or more hardware memories storing instructions that when executed configure the hardware processing circuitry to perform operations comprising:
   receiving an image;
   identifying handwriting in the image by:
      detecting a plurality of features in the image;
      detecting a subset of the plurality of features arranged linearly in the image;
      detecting a region of the image bounding the subset of the plurality of features;
      determining a probability that the region includes handwriting; and
      determining the probability is above a threshold resulting in identification of handwriting; and
   responsive to the identification of handwriting, identifying a language type of the handwriting; and
      generating, based on the region, a plurality of geometric metrics defining frequencies of geometric features within the region, the geometric features including three or more of:
   line segments, boxes, curves, loop, orthogonal intersections, cross-overs, corners, closed curves, or connected curves;
      providing, to a trained model, the plurality of geometric metrics; and
      determining from the trained model, the language type of handwriting within the region.

18. The system of claim 17, wherein the generating of the plurality of geometric metrics comprises determining a length and a height of the region, wherein a count of a geometric feature of the geometric features occurring along the length of the region is normalized based on the height and the length of the region, the method further comprising generating a frequency of the geometric feature based on the normalized count.

19. The system of claim 17, wherein the geometric features include line segments, boxes, curves, loops; orthogonal intersections, cross-overs, corners, closed curves, or connected curves.

20. The system of claim 17, the operations further comprising generating second geometric metrics identifying frequencies of adjoining geometric feature pairs within the region, and providing the second geometric metrics to the trained model.

* * * * *